United States Patent
Tang et al.

(10) Patent No.: US 12,541,304 B2
(45) Date of Patent: Feb. 3, 2026

(54) MEMORY DEVICE, OPERATION METHOD THEREOF, MEMORY SYSTEM, AND MEMORY CONTROLLER

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Wen Luo, Wuhan (CN); Chaofan Xie, Wuhan (CN); Yufei Feng, Wuhan (CN); Cheng Han, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/821,643

(22) Filed: Aug. 30, 2024

(65) Prior Publication Data
US 2025/0328257 A1    Oct. 23, 2025

Related U.S. Application Data

(63) Continuation of application No. PCT/CN2024/088865, filed on Apr. 19, 2024.

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
USPC .......................................... 711/103
See application file for complete search history.

(56) References Cited

U.S. PATENT DOCUMENTS

| | | | | |
|---|---|---|---|---|
| 10,685,711 | B1* | 6/2020 | Lin | G06F 3/0652 |
| 2016/0276040 | A1* | 9/2016 | Han | G11C 13/004 |

FOREIGN PATENT DOCUMENTS

| | | | | |
|---|---|---|---|---|
| CN | 103578523 | A | 2/2014 | |
| CN | 103778962 | A | 5/2014 | |
| CN | 104952486 | A | 9/2015 | |
| CN | 111913829 | A | 11/2020 | |
| CN | 113223593 | A | 8/2021 | |
| CN | 113421601 | A | 9/2021 | |
| CN | 115148269 | A | 10/2022 | |
| TW | 202424976 | A * | 6/2024 | G11C 16/08 |

* cited by examiner

*Primary Examiner* — Mardochee Chery
(74) *Attorney, Agent, or Firm* — BAYES PLLC

(57) ABSTRACT

According to one aspect of the present disclosure, a memory device is provided. The memory device may include a memory cell array including a plurality of memory cells. A preset number of the memory cells may form a code word. The memory device may include a peripheral circuit coupled with the memory cell array. The peripheral circuit may be configured to obtain M first results corresponding to at least one code word at M target read voltages. The peripheral circuit may be configured to obtain a predicted valley voltage according to the M first results and the M target read voltages in conjunction with a preset function model. The peripheral circuit may be configured to determine a target valley voltage based on the predicted valley voltage. The target valley voltage may be configured as a read voltage for a read operation on the at least one code word.

20 Claims, 25 Drawing Sheets

MEMORY DEVICE, OPERATION METHOD THEREOF, MEMORY SYSTEM, AND MEMORY CONTROLLER

CROSS-REFERENCE TO RELATED APPLICATIONS

The present application is a continuation of International Application No. PCT/CN2024/088865, filed on Apr. 19, 2024, which is hereby incorporated by reference in its entirety.

TECHNICAL FIELD

Examples of the present disclosure relate to the field of semiconductor technology, and relate to, but are not limited to, a memory device, an operation method thereof, a memory system, a memory controller, and a storage medium.

BACKGROUND

With the development of science and technology, the market scale of the integrated circuit industry is getting bigger and bigger, the process and technology of non-volatile memory devices in the entire integrated circuit industry have been developed by leaps and bounds in recent years, and the application of a NAND memory is especially wide. The NAND memory captures and stores charges in a gate dielectric layer of a memory cell included therein, so as to realize the function of data storage. However, with the increase of use time, the charges stored in the memory cell vary with the increase of the use time, repeated read operations, cross temperature, etc., thus affecting the accuracy of reading data stored in the memory cell.

SUMMARY

According to one aspect of the present disclosure, a memory device is provided. The memory device may include a memory cell array including a plurality of memory cells. A preset number of the memory cells may form a code word. The memory device may include a peripheral circuit coupled with the memory cell array. The peripheral circuit may be configured to obtain M first results corresponding to at least one code word at M target read voltages. The first result includes a number of bits which represents the number of flipped bits in the at least one code word in two read results at a first read voltage and a second read voltage. A difference between the first read voltage and the second read voltage may be less than a preset voltage. The peripheral circuit may be configured to obtain a predicted valley voltage according to the M first results and the M target read voltages in conjunction with a preset function model. The preset function model may represent a relationship between the first results and the target read voltages. M may be an integer greater than or equal to 1. The peripheral circuit may be configured to determine a target valley voltage based on the predicted valley voltage. The target valley voltage may be configured as a read voltage for a read operation on the at least one code word.

In some implementations, the preset function model may include a quadratic function model including the following function relation: $y=a(x+b)^2+c$, where y is the first result, x is the target read voltage, b is to represent a prediction parameter, a is a first parameter, and c is a second parameter.

In some implementations, the peripheral circuit may be configured to obtain N sets of prediction parameters according to the M first results, the M target read voltages and the quadratic function model, where $$N = C_M^i,$$

i is an integer, and $1 \leq i \leq M$. In some implementations, the peripheral circuit may be configured to obtain the predicted valley voltage according to the N sets of prediction parameters.

In some implementations, i may be equal to 1. In some implementations, both of the first parameter and the second parameter may be constants. In some implementations, the peripheral circuit may be configured to obtain the N sets of prediction parameters according to the M first results, the M target read voltages, the quadratic function model, the first parameter and the second parameter.

In some implementations, i may be equal to 2. In some implementations, the first parameter may be a variable and the second parameter may be a constant. In some implementations, the peripheral circuit may be configured to obtain the N sets of prediction parameters and the first parameter according to the M first results, the M target read voltages, the quadratic function model and the second parameter.

In some implementations, i may be equal to 3. In some implementations, both of the first parameter and the second parameter may be variables. In some implementations, the peripheral circuit may be configured to obtain the N sets of prediction parameters, the first parameter and the second parameter according to the M first results, the M target read voltages and the quadratic function model.

In some implementations, i may be equal to M. In some implementations, the peripheral circuit may be configured to obtain one set of prediction parameters according to the M first results, the M target read voltages and the quadratic function model. In some implementations, the peripheral circuit may be configured to take the prediction parameters as the predicted valley voltage.

In some implementations, i may be less than M. In some implementations, the peripheral circuit may be configured to determine outliers of the N sets of prediction parameters. In some implementations, the peripheral circuit may be configured to take a median or an average value of the remaining prediction parameters after removal of the outliers from the N sets of prediction parameters as the predicted valley voltage.

In some implementations, the memory cell array may include memory cells each having a plurality of storage bits. In some implementations, the plurality of storage bits correspond to a plurality of pages respectively. In some implementations, at least one of the pages may correspond to a plurality of stages. In some implementations, the plurality of stages may include a first stage and a second stage. In some implementations, a read voltages of the second stage may be less than a read voltage of the first stage. In some implementations, the peripheral circuit may be configured to obtain at least one of a predicted valley voltage of the second stage or predicted valley voltages of the remaining first stages having lower read voltages in the plurality of stages according to the predicted valley voltage of the first stage of each of the plurality of pages. In some implementations, the peripheral circuit may be configured to perform a read operation on the at least one code word according to the predicted valley voltage of the first stage and the predicted valley voltage of the second stage of each page.

In some implementations, the peripheral circuit may be configured to determine the predicted valley voltage of each stage as the target valley voltage according to successful error correction decoding on a read result of the read operation. In some implementations, the peripheral circuit may be configured to re-obtain a first result corresponding to the at least one code word at one target read voltage of the first stage according to failed error correction decoding on the read result of the read operation. In some implementations, the peripheral circuit may be configured to re-obtain the prediction parameters according to a plurality of first results obtained and a plurality of target read voltages in conjunction with the preset function model. In some implementations, the peripheral circuit may be configured to perform the read operation on the at least one code word based on the re-obtained prediction parameters until the error correction decoding on the read result of the read operation is successful.

In some implementations, the peripheral circuit may be configured to obtain a preset threshold according to a corresponding first result at a first target read voltage of the M target read voltages. In some implementations, the preset threshold may be configured to represent a first result corresponding to a maximum value in an effective range of predicted valley voltage. In some implementations, the peripheral circuit may be configured to take the predicted valley voltage as the target valley voltage according to the first result corresponding to the predicted valley voltage being less than the preset threshold.

In some implementations, the memory cell array may include memory cells each having a plurality of storage bits. In some implementations, the plurality of storage bits may correspond to a plurality of pages respectively. In some implementations, at least one of the pages may correspond to a plurality of stages. In some implementations, the peripheral circuit may be configured to, after determining a target valley voltage of the at least one code word at a target stage, respectively determine target valley voltages of other stages in the plurality of stages than the target stage.

In some implementations, the peripheral circuit may be configured to read a storage data of the at least one code word at the first read voltage to obtain a second result. In some implementations, the peripheral circuit may be configured to read the storage data of the at least one code word at the second read voltage to obtain a third result. In some implementations, the peripheral circuit may be configured to perform a logic operation on the second result and the third result to obtain a fourth result. In some implementations, the peripheral circuit may be configured to count the number of bits in the fourth result that represent flip of bits in the third result compared to the second result to obtain the first result.

In some implementations, the peripheral circuit may include a first latch configured to store the second result. In some implementations, the peripheral circuit may include a second latch configured to store the third result. In some implementations, the peripheral circuit may include a third latch configured to store the fourth result.

According to another aspect of the present disclosure, a memory system is provided. The memory system may include one or more memory devices. Each of the one or more memory devices may include a memory cell array including a plurality of memory cells. A preset number of the memory cells form a code word. Each of the one or more memory devices may include a peripheral circuit coupled with the memory cell array. The peripheral circuit may be configured to obtain M first results corresponding to at least one code word at M target read voltages. The first result may include a number of bits which represents the number of flipped bits in the at least one code word in two read results at a first read voltage and a second read voltage. A difference between the first read voltage and the second read voltage may be less than a preset voltage. The peripheral circuit may be configured to obtain a predicted valley voltage according to the M first results and the M target read voltages in conjunction with a preset function model. The preset function model may represent a relationship between the first results and the target read voltages. M may be an integer greater than or equal to 1. The peripheral circuit may be configured to determine a target valley voltage based on the predicted valley voltage. The target valley voltage may be configured as a read voltage for a read operation on the at least one code word. The memory system may include a memory controller coupled with the one or more memory devices and configured to control the one or more memory devices.

In some implementations, the memory controller may be configured to send a data acquisition instruction. In some implementations, the data acquisition instruction may indicate acquisition of the target valley voltage. In some implementations, the memory device may be configured to receive the data acquisition instruction, obtain the target valley voltage, and send information including the target valley voltage to the memory controller. In some implementations, the memory controller may be further configured to perform the read operation on data stored in the memory device according to the target valley voltage in the information.

In some implementations, the memory controller may be further configured to perform an error correction decoding operation on a read result of the read operation.

According to a further aspect of the present disclosure, a memory controller is provided. The memory controller may include a control component configured to obtain M first results corresponding to at least one code word at M target read voltages. The first result may include a number of bits which represents the number of flipped bits in the at least one code word in two read results at a first read voltage and a second read voltage. A difference between the first read voltage and the second read voltage may be less than a preset voltage. The memory controller may include a control component configured to obtain a predicted valley voltage according to the M first results and the M target read voltages in conjunction with a preset function model. The preset function model represents a relationship between the first results and the target read voltages. M may be an integer greater than or equal to 1. The memory controller may include a control component configured to determine a target valley voltage based on the predicted valley voltage. The target valley voltage may be configured as a read voltage for a read operation on the at least one code word. The memory controller may be coupled with at least one memory device. The memory device may include a plurality of memory cells. A preset number of the memory cells may form a code word.

In some implementations, the preset function model may include a quadratic function model including the following function relation: $y=a(x+b)^2+c$, where y is the first result, x is the target read voltage, b is to represent a prediction parameter, a is a first parameter, and c is a second parameter.

In some implementations, the control component may be configured to obtain N sets of prediction parameters according to the M first results, the M target read voltages and the preset function model. In some implementations, $$N = C_M^i,$$

i may be an integer, and 1≤i≤M. In some implementations, the control component may be configured to obtain the predicted valley voltage according to the N sets of prediction parameters.

In some implementations, i may be equal to 1. In some implementations, both of the first parameter and the second parameter may be constants. In some implementations, the control component may be configured to obtain the N sets of prediction parameters according to the M first results, the M target read voltages, the preset function model, the first parameter, and the second parameter.

In some implementations, i may be equal to 2. In some implementations, the first parameter may be a variable, and the second parameter may be a constant. In some implementations, the control component may be configured to obtain the N sets of prediction parameters and the first parameter according to the M first results, the M target read voltages, the preset function model, and the second parameter.

In some implementations, i may be equal to 3. In some implementations, both of the first parameter and the second parameter may both be variables. In some implementations, the control component may be configured to obtain the N sets of prediction parameters, the first parameter and the second parameter according to the M first results, the M target read voltages, and the preset function model.

In some implementations, i may be equal to M. In some implementations, the control component may be configured to obtain one set of prediction parameters according to the M first results, the M target read voltages, and the preset function model. In some implementations, the control component may be configured to take the prediction parameters as the predicted valley voltage.

In some implementations, i may be less than M. In some implementations, the control component may be configured to determine outliers of the N sets of prediction parameters. In some implementations, the control component may be configured to take a median or an average value of the remaining prediction parameters after removal of the outliers from the N sets of prediction parameters as the predicted valley voltage.

In some implementations, each memory cell in the plurality of memory cells have a plurality of storage bits. In some implementations, the plurality of storage bits may correspond to a plurality of pages respectively. In some implementations, at least one of the pages may correspond to a plurality of stages. In some implementations, the plurality of stages may include a first stage and a second stage. In some implementations, a read voltage of the second stage may be less than a read voltage of the first stage. In some implementations, the control component may be configured to obtain the predicted valley voltage of the second stage according to the predicted valley voltage of the first stage of each of the plurality of pages. In some implementations, the control component may be configured to perform a read operation on the at least one code word according to the predicted valley voltage of the first stage and the predicted valley voltage of the second stage of each page.

In some implementations, the control component may be configured to determine the predicted valley voltage of each stage as the target valley voltage according to successful error correction decoding on a read result of the read operation. In some implementations, the control component may be configured to re-obtain a first result corresponding to the at least one code word at one target read voltage of the first stage according to failed error correction decoding on the read result of the read operation. In some implementations, the control component may be configured to re-obtain the prediction parameters according to a plurality of first results obtained and a plurality of target read voltages in conjunction with the preset function model. In some implementations, the control component may be configured to perform the read operation on the at least one code word based on the re-obtained prediction parameters until the error correction decoding on the read result of the read operation is successful.

In some implementations, the control component may be configured to obtain a preset threshold according to a corresponding first result at a first target read voltage of the M target read voltages. In some implementations, the preset threshold may be configured to represent a first result corresponding to a maximum value in an effective range of the predicted valley voltage. In some implementations, the control component may be configured to take the predicted valley voltage as the target valley voltage according to the first result corresponding to the predicted valley voltage being less than the preset threshold.

In some implementations, the memory device may include memory cells each having a plurality of storage bits. In some implementations, the plurality of storage bits may correspond to a plurality of pages respectively. In some implementations, at least one of the pages corresponds to a plurality of stages. In some implementations, the control component may be configured to, after determining a valley voltage of the at least one code word at a target stage, respectively determine the target valley voltages of other stages in the plurality of stages than the target stage.

According to still another aspect of the present disclosure, a method of operating a memory device is provided. The method may include obtaining M first results corresponding to at least one code word at M target read voltages. The first result may include a number of bits which represents the number of flipped bits in the at least one code word in two read results at a first read voltage and a second read voltage. A difference between the first read voltage and the second read voltage may be less than a preset voltage. The method may include obtaining a predicted valley voltage according to the M first results and the M target read voltages in conjunction with a preset function model. The preset function model may represent a relationship between the first results and the target read voltages. M may be an integer greater than or equal to 1. The method may include determining a target valley voltage based on the predicted valley voltage. The target valley voltage may be configured as a read voltage for a read operation on the at least one code word. The memory device may include a plurality of memory cells. A preset number of the memory cells may form a code word.

In some implementations, the preset function model may include a quadratic function model including the following function relation: $y=a(x+b)^2+c$, where y is the first result, x is the target read voltage, b is to represent a prediction parameter, a is a first parameter, and c is a second parameter.

In some implementations, the method may include obtaining N sets of prediction parameters according to the M first results, the M target read voltages, and the preset function model. In some implementations, $$N = C_M^i,$$

i may be an integer, and 1≤i≤M. In some implementations, the method may include obtaining the predicted valley voltage according to the N sets of prediction parameters.

According to yet a further aspect of the present disclosure, a non-transitory computer-readable medium storing instructions is provided. The instructions, which when executed by a processor of a memory device, may cause the processor of the memory device to obtain M first results corresponding to at least one code word at M target read voltages. The first result may include a number of bits which represents the number of flipped bits in the at least one code word in two read results at a first read voltage and a second read voltage. A difference between the first read voltage and the second read voltage may be less than a preset voltage. The instructions, which when executed by a processor of a memory device, may cause the processor of the memory device to obtain a predicted valley voltage according to the M first results and the M target read voltages in conjunction with a preset function model. The preset function model may represent a relationship between the M first results and the M target read voltages. M may be an integer greater than or equal to 1. The instructions, which when executed by a processor of a memory device, may cause the processor of the memory device to determine a target valley voltage based on the predicted valley voltage. The target valley voltage may be configured as a read voltage for a read operation on the at least one code word. The memory device may include a plurality of memory cells. A preset number of the memory cells may form a code word.

BRIEF DESCRIPTION OF THE DRAWINGS

In the drawings, unless stated otherwise, same reference signs throughout a plurality of drawings represent same or similar parts or elements. These drawings are not necessarily drawn to scale. It is to be understood that these drawings merely describe some implementations disclosed according to the present disclosure, and should not be considered as limiting the scope of the present disclosure.

DETAILED DESCRIPTION

Figure 1:
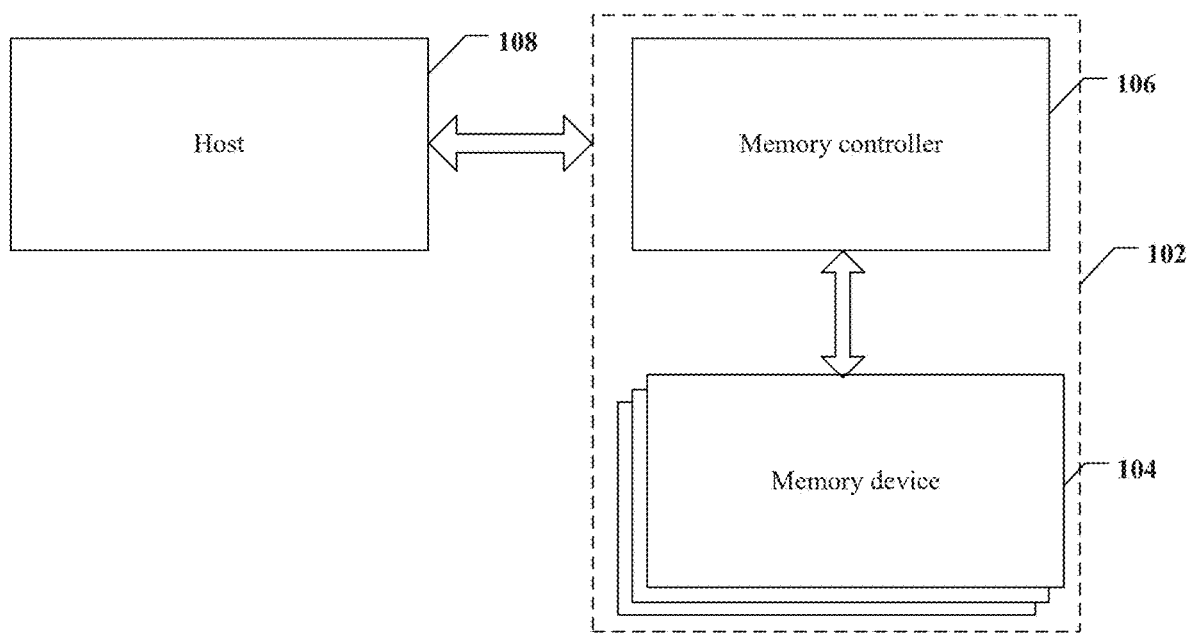
FIG. 1 is a schematic diagram of an example system having a memory system according to an example of the present disclosure.

Example implementations disclosed by the present disclosure will be described below in more detail with reference to the drawings. Although example implementations of the present disclosure are shown in the figures, it is to be understood that the present disclosure may be implemented in various ways without being limited by the implementations as set forth herein. On the contrary, these implementations are provided for more thorough understanding of the present disclosure, and to fully convey a scope disclosed in the examples of the present disclosure to a person skilled in the art.

In the following descriptions, a lot of details are given in order to provide the more thorough understanding of the present disclosure. However, it is apparent to those skilled in the art that the present disclosure may be implemented without one or more of these details. In other examples, in order to avoid confusion with the present disclosure, some technical features well-known in the field are not described. Namely, all the features of the actual examples are not described here, and well-known functions and structures are not described in detail.

Moreover, the drawings are merely schematic illustrations of the present disclosure and are not necessarily drawn to scale. The same reference signs in the drawings denote same or similar portions, and thus detailed descriptions will be omitted. Some of the block diagrams shown in the drawings are functional entities and do not necessarily have to correspond to physically or logically separate entities. These functional entities may be implemented in a software form, or in one or more hardware modules or integrated circuits, or in different networks and/or processor devices and/or microcontroller devices.

The flowcharts shown in the drawings are example descriptions only and are not necessary to include all operations. For example, some operations can also be broken down, while others can be combined or partially combined, such that an actual order of execution is likely to change depending on actual situations.

A purpose of the terms used here is only to describe the particular examples and not as limitation to the present disclosure. As used herein, unless otherwise indicated expressly in the context, "a", "an" and "the" in a singular form are also intended to include a plural form. It should also be understood that terms "composition" and/or "comprising", while used in the description, determine the existence of the described features, integers, steps, operations, elements and/or components, but do not exclude the existence of one or more other features, integers, steps, operations, elements, components, and/or groups. As used herein, a term "and/or" includes any and all combinations of related items listed.

A memory device in examples of the present disclosure includes, but is not limited to, a three-dimensional NAND memory. For ease of understanding, the three-dimensional NAND memory is used as an example for description.

FIG. 1 shows a block diagram of an example system 100 having a memory device according to some aspects of the present disclosure. The system 100 may be a mobile phone, a desktop computer, a laptop computer, a tablet computer, a vehicle computer, a gaming console, a printer, a positioning device, a wearable electronic device, a smart sensor, a Virtual Reality (VR) device, an Augmented Reality (AR) device, or any other suitable electronic device having storage therein. As shown in FIG. 1, the system 100 may include a host 108 and a memory system 102 having one or more memory devices 104 and a memory controller 106. The host 108 may be a processor of an electronic device (e.g., a Central Processing Unit (CPU)) or a System-on-Chip (SoC) (e.g., an Application Processor (AP)). The host 108 may be configured to send or receive data to or from the memory device 104.

According to some implementations, the memory controller 106 is coupled to the memory device 104 and the host 108, and is configured to control the memory device 104. The memory controller 106 may manage data stored in the memory device 104, and communicate with the host 108. In some implementations, the memory controller 106 is designed for operating in a low duty-cycle environment, such as secure digital (SD) cards, compact flash (CF) cards, universal serial bus (USB) flash drives, or other media for use in electronic devices, such as personal computers, digital cameras, mobile phones, etc.

In some implementations, the memory controller 106 is designed for operating in high duty-cycle environment solid state disks (SSDs) or embedded multi-media cards (eMMCs) used as data storage for mobile devices, such as smartphones, tablets, laptop computers, etc., and enterprise storage arrays.

The memory controller 106 may be configured to control operations of the memory device 104, such as read, erase, and program operations. The memory controller 106 may be further configured to manage various functions with respect to data stored or to be stored in the memory device 104. These functions may include, but are not limited to, bad-block management, garbage collection, logical-to-physical address conversion, wear leveling, etc. In some implementations, the memory controller 106 is further configured to process an error correction code (ECC) with respect to the data read from or written to the memory device 104.

The memory controller 106 may further perform any other suitable functions as well, for example, formatting the memory device 104. The memory controller 106 may communicate with an external device (e.g., the host 108) according to a particular communication protocol. For example, the memory controller 106 may communicate with the external device through at least one of various interface protocols, such as a USB protocol, an MMC protocol, a Peripheral Component Interconnection (PCI) protocol, a PCI Express (PCI-E) protocol, an Advanced Technology Attachment (ATA) protocol, a serial-ATA protocol, a parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

The memory controller 106 and the one or more memory devices 104 can be integrated into various types of storage devices, for example, be included in the same package, such as a Universal Flash Storage (UFS) package or an eMMC package. That is, the memory system 102 may be implemented and packaged into different types of end electronic products.

Figure 2A:
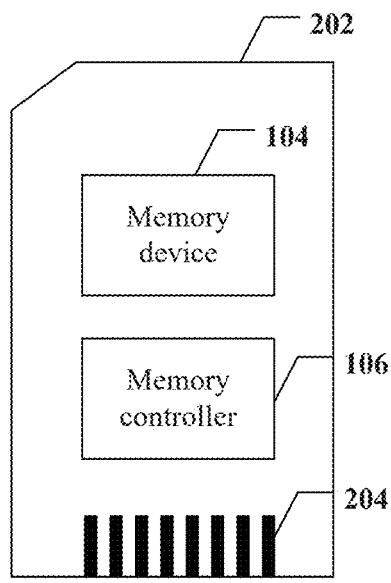
FIG. 2A is a schematic diagram of an example memory card having a memory system according to an example of the present disclosure.

In an example shown in FIG. 2A, the memory controller 106 and the single memory device 104 may be integrated into a memory card 202. The memory card 202 may include a PC card (e.g., Personal Computer Memory Card International Association (PCMCIA)), a compact flash (CF) card, a Smart Media (SM) card, a memory stick, a Multimedia card (MMC) (e.g., reduced size (RS)-MMC, MMCmicro, etc.), a secure digital (SD) card (e.g., miniSD, microSD, SD high capacity (SDHC)), a UFS, etc. The memory card 202 may further include a memory card connector 204 coupling the memory card 202 with a host (e.g., the host 108 in FIG. 1).

Figure 2B:
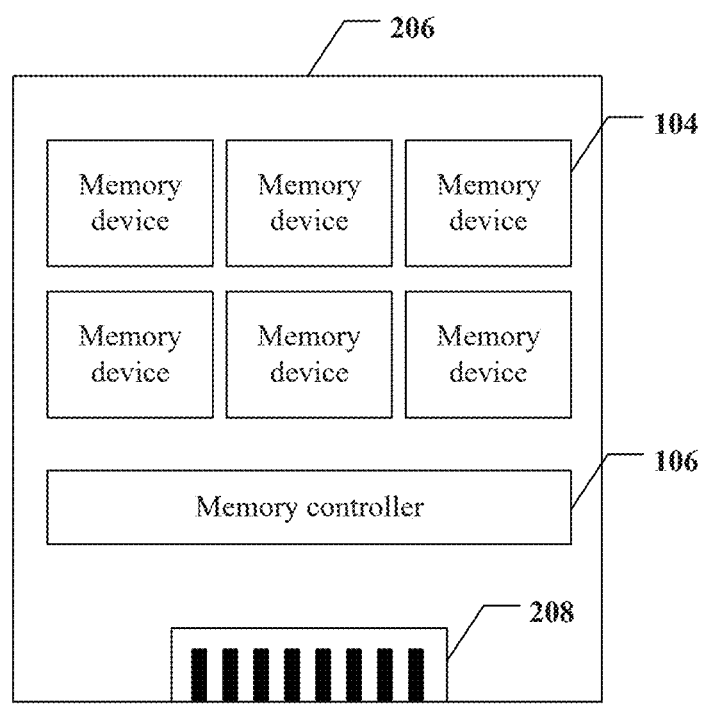
FIG. 2B is a schematic diagram of an example solid-state drive having a memory system according to an example of the present disclosure.

In another example as shown in FIG. 2B, the memory controller 106 and a plurality of memory devices 104 may be integrated into an solid-state drive (SSD) 206. The SSD 206 may further include an SSD connector 208 coupling the SSD 206 with a host (e.g., the host 108 in FIG. 1). In some implementations, at least one of a storage capacity or an operation speed of the SSD 206 is greater than at least one of a storage capacity or an operation speed of the memory card 202.

In some examples, each memory block may be coupled to a plurality of word lines, and a plurality of memory cells coupled to each word line form a physical page.

Figure 3:
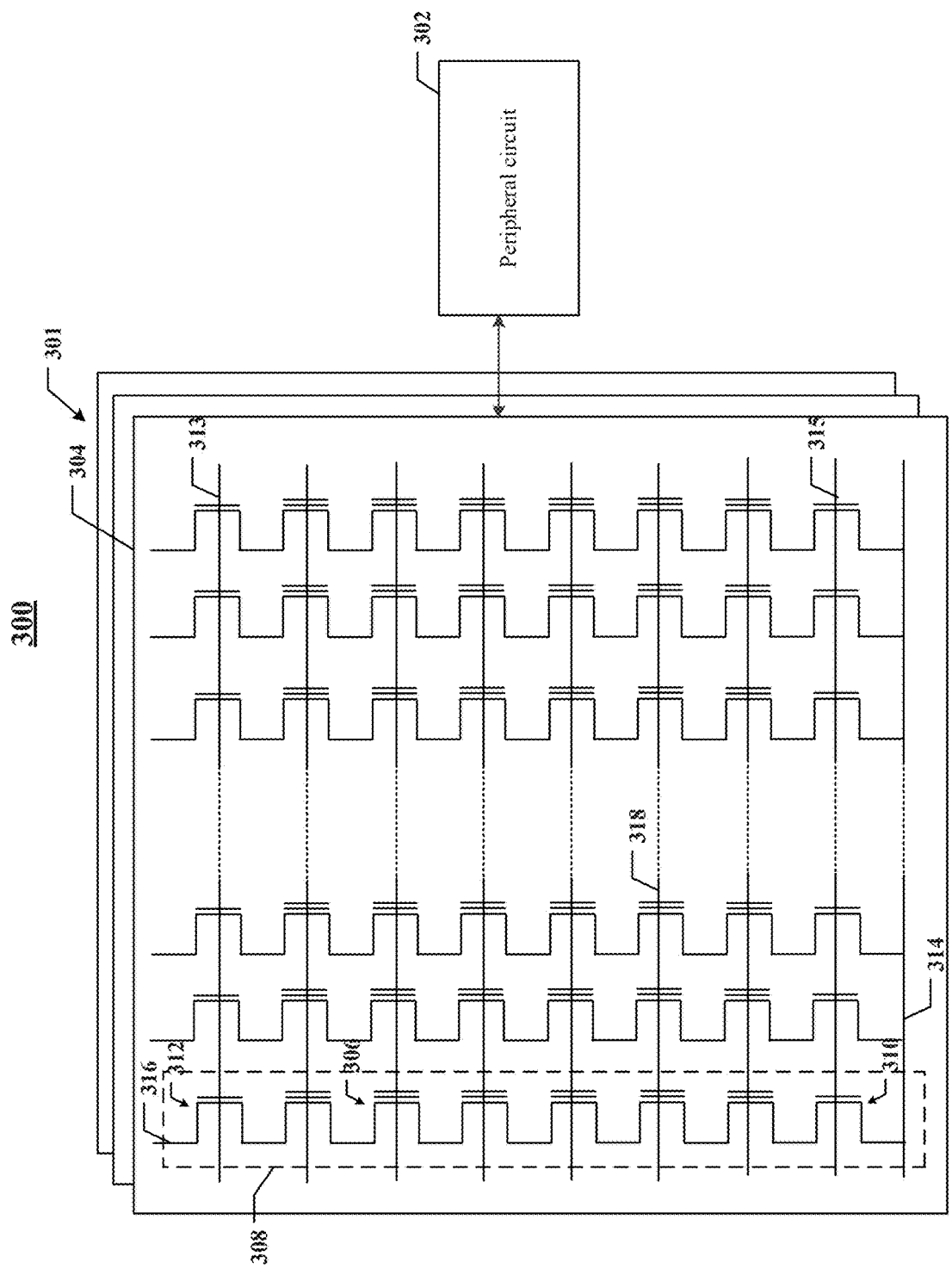
FIG. 3 is a schematic diagram of an example memory including a peripheral circuit according to an example of the present disclosure.

FIG. 3 illustrates a schematic circuit diagram of an example memory device 300 including a peripheral circuit according to some aspects of the present disclosure. The memory device 300 may be an example of the memory device 104 in FIG. 1. The memory device 300 may include a memory cell array 301 and a peripheral circuit 302 coupled to the memory cell array 301. The memory cell array 301 being a three-dimensional NAND memory cell array is taken as an example for illustration, where a memory cell 306 is a NAND memory cell; the memory cell 306 is provided in a form of an array of memory strings 308; and each memory string 308 vertically extends above a substrate (not shown). In some implementations, each memory string 308 includes a plurality of memory cells 306 coupled in series and stacked vertically. Each memory cell 306 may maintain a continuous analog value, such as a voltage or charge, which depends on the number of electrons trapped within a region of the memory cell 306. Each memory cell 306 may be either a floating gate type of memory cell including a floating gate transistor, or a charge trap type of memory cell including a charge trap transistor.

In some implementations, each memory cell 306 is a single-level cell (SLC) that has two possible memory states and thus may store one bit of data. For example, a first memory state "0" may correspond to a first voltage range, and a second memory state "1" may correspond to a second range of voltages. In some implementations, each memory cell 306 is a multi-level cell (MLC) that is capable of storing more than one bit of data in more than four memory states. For example, the MLC can store two bits per cell (which may be also called a double-level cell), three bits per cell (also called a trinary-level cell (TLC)), four bits per cell (also called a quad-level cell (QLC)), five bits per cell (also called a penta-level cell (PLC)), or more than five bits per cell. Each MLC may be programmed to assume a range of possible nominal storage values. In one example, if each MLC stores two bits of data, the MLC can be programmed to assume one of three possible programing levels from an erase state by writing one of three possible nominal storage values to the cell, and a fourth nominal storage value may be used for the erase state.

It is to be noted that the memory state described here is the memory state of the memory cell described in the present disclosure. Different memory cells have different numbers of memory states, for example, the SLC-type memory cell has 2 memory states (e.g., two memory states), where the 2 memory states include one program state and one erase state. For another example, the MLC-type memory cell has 4 memory states, where the 4 memory states include one erase state and three program states. For yet another example, the TLC-type memory cell has 8 memory states, where the 8 memory states include one erase state and seven program states. In some implementations, the QLC-type memory cell has 16 memory states, where the 16 memory states include one erase state and fifteen program states.

As shown in FIG. 3, each memory string 308 may include a bottom select transistor (BSG) 310 (also referred to as a source side select transistor) at a source terminal thereof and a top select transistor (TSG) 312 (also referred to as a drain side select transistor) at a drain terminal thereof. The BSG 310 and the TSG 312 may be configured to activate a selected memory string 308 during read and program operations. In some implementations, sources of the memory strings 308 in a same memory block 304 are coupled through a same source line (SL) 314 (e.g., a common SL). In other words, according to some implementations, all the memory strings 308 in the same memory block 304 have an array common source (ACS). According to some implementations, the TSG 312 of each memory string 308 is coupled to a respective bit line (BL) 316, and data may be read or written from the bit line 316 via an output bus (not shown). In some implementations, each memory string 308 is configured to be selected or deselected by applying a select voltage (e.g., above a threshold voltage of a transistor having the TSG 312) or a deselect voltage (e.g., 0 V) to the respective TSG 312 via one or more TSG lines 313 and/or by applying a select voltage (e.g., above a threshold voltage of a transistor having the BSG 310) or a deselect voltage (e.g., 0 V) to the respective BSG 310 via one or more BSG lines 315.

As shown in FIG. 3, the memory string 308 may be organized into a plurality of memory blocks 304, and each of the plurality of memory blocks 304 may have a common source line 314 (e.g., coupled to the ground). In some implementations, each memory block 304 is a basic data unit for an erase operation. That is, all of the memory cells 306 on the same memory block 304 are erased concurrently. In order to erase the memory cells 306 in a selected memory block 304, the source line 314 coupled to the selected memory block 304 as well as unselected memory blocks 304 that are in the same plane as the selected memory block 304 can be biased with an erase voltage (Vers) (e.g., a high positive voltage (e.g., 20 V or higher)). It is to be understood that in some examples, the erase operation may be performed at a half memory block level, a quarter memory block level, or a level having any suitable number of memory blocks or any suitable fraction of a memory block. The memory cells 306 of adjacent ones of the memory strings 308 may be coupled through a word line 318 that selects which row of memory cells 306 is affected by the read and program operations.

Referring to FIG. 3, each of the plurality of memory cells 306 is coupled to the respective word line 318, and each memory string 308 is coupled to the respective bit line 316 through a respective select transistor (e.g., the top select transistor (TSG) 312).

Figure 4:
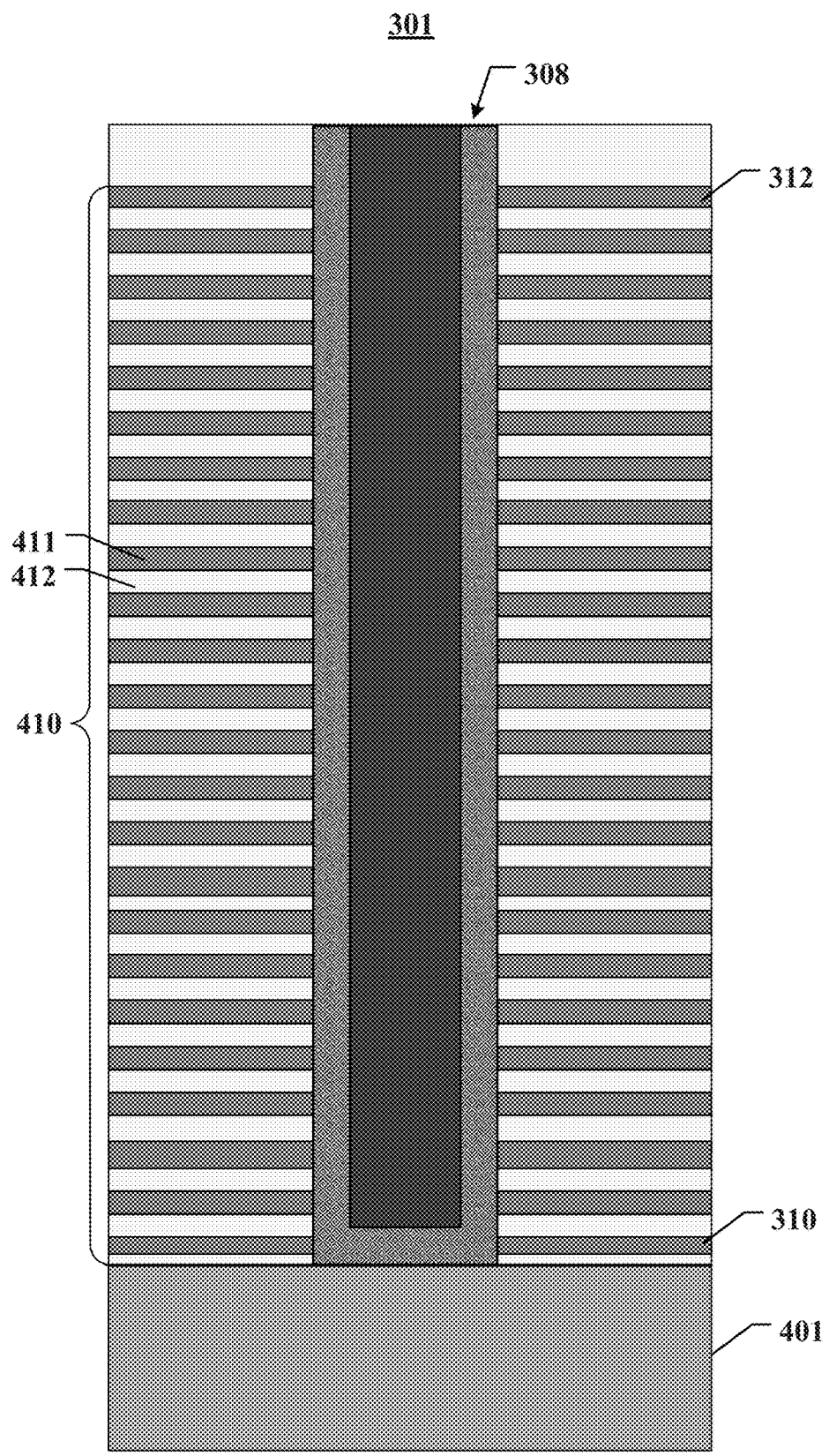
FIG. 4 is a schematic cross-sectional view of a memory cell array including a NAND memory string according to an example of the present disclosure.

FIG. 4 shows a schematic cross-sectional view of an example memory cell array 301 including a memory string 308 with NAND as an example according to some aspects of the present disclosure. As shown in FIG. 4, the NAND memory cell array 301 may include a stack structure 410. The stack structure 410 includes a plurality of gate layers 411 and a plurality of insulation layers 412 that are sequentially and alternately stacked, and a channel structure that penetrates through the gate layers 411 and the insulation layers 412 vertically. The channel structure is coupled with each gate layer to form a memory cell. The channel structure is coupled with the plurality of gate layers in the stack structure 410 to form the memory string 308. The gate layers 411 and the insulation layers 412 may be alternately stacked, and two adjacent ones of the gate layers 411 are spaced apart by one insulation layer 412.

A constituent material of the gate layers 411 may include a conductive material. The conductive material includes, but is not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may include a control gate surrounding the memory cell. The gate layer 411 at the top of the stack structure 410 may extend laterally as a top select gate line. The gate layer 411 at the bottom of the stack structure 410 may extend laterally as a bottom select gate line. The gate layer 411 that extends laterally between the top select gate line and the bottom select gate line may act as word line layer.

In some examples, the stack structure 410 may be disposed on a substrate 401. The substrate 401 may include silicon (e.g., single crystalline silicon), silicon germanium (SiGe), gallium arsenide (GaAs), germanium (Ge), silicon-on-insulator (SOI), germanium-on-insulator (GOI), or any other suitable materials.

In some examples, the memory string 308 includes a channel structure that extends through the stack structure 410 vertically. In some implementations, the channel structure includes a channel hole filled with (one or more) semiconductor materials (e.g., as a semiconductor channel) and (one or more) dielectric materials (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer, and the barrier layer are arranged radially from the center toward the outer surface of the pillar in this order. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In an example, the memory film may include a composite layer of silicon oxide/silicon oxynitride/silicon oxide (ONO).

Figure 5:
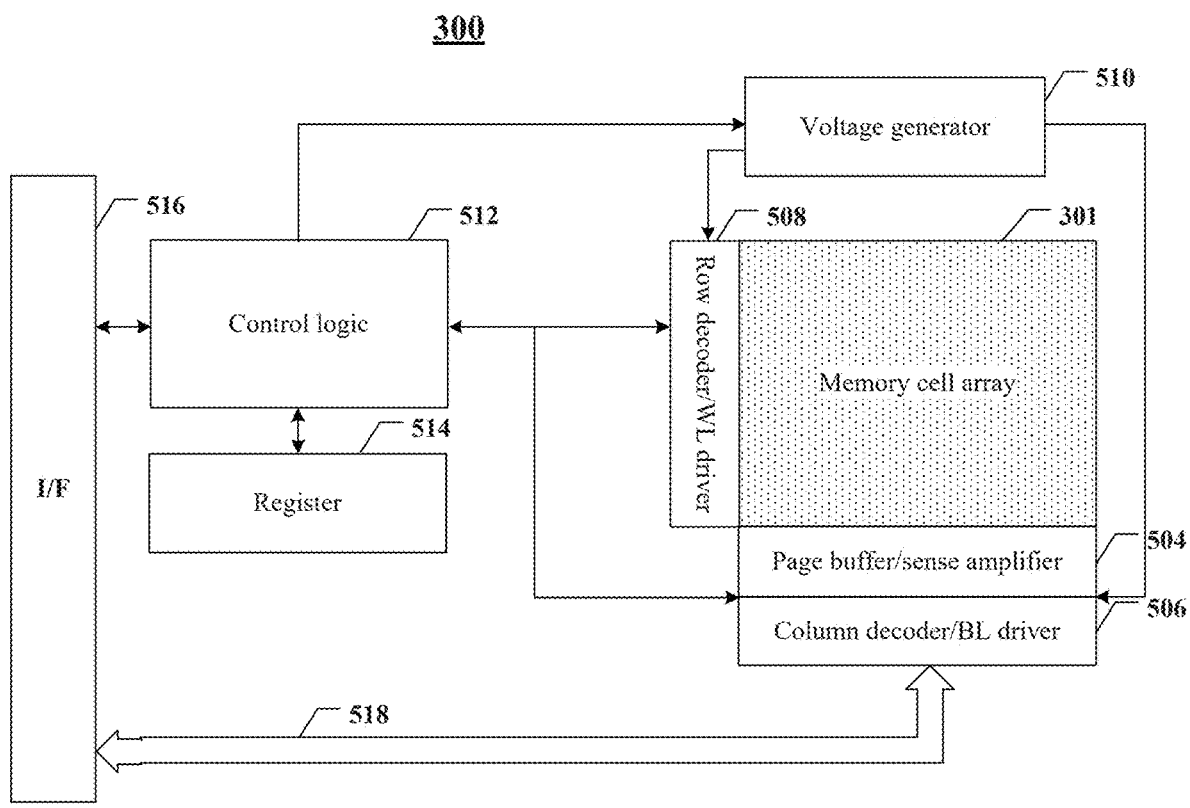
FIG. 5 is a schematic diagram of an example memory device including a memory cell array and a peripheral circuit according to an example of the present disclosure.

Referring back to FIG. 3, the peripheral circuit 302 may be coupled to the memory cell array 301 through the bit line 316, the word line 318, the source line 314, the BSG line 315 and the TSG line 313. The peripheral circuit 302 may include any suitable analog, digital, and hybrid signal circuits for facilitating operations of the memory cell array 301 by applying voltage signals and/or current signals to each target memory cell 306 and sensing voltage signals and/or current signals from each target memory cell 306 via the bit line 316, the word line 318, the source line 314, the BSG line 315, and the TSG line 313. The peripheral circuit 302 may include various types of peripheral circuits formed using a metal-oxide-semiconductor (MOS) technology. For example, FIG. 5 shows some example peripheral circuits. The peripheral circuit includes a page buffer/sense amplifier 504, a column decoder/bit line driver 506, a row decoder/word line driver 508, a voltage generator 510, a control logic 512, a register 514, an interface 516, and a data bus 518. It is to be understood that, in some examples, additional peripheral circuits not shown in FIG. 5 may also be included as well.

The page buffer/sense amplifier 504 may be configured to read and program (write) data from and to the memory cell array 301 according to a control signal from the control logic 512. In one example, the page buffer/sense amplifier 504 may store program data (write data) to be programmed to the memory cell array 301. In another example, the page buffer/sense amplifier 504 may perform a program verify operation to ensure that the data has been properly programmed into the memory cell 306 coupled to the selected word line 318. In yet another example, the page buffer/sense amplifier 504 may also sense a low-power signal from the bit line 316 that represents a data bit stored in the memory cell 306, and amplifies a small voltage swing to a recognizable logic level in the read operation. The column decoder/bit line driver 506 may be configured to be controlled by the control logic 512 and select one or more memory strings 308 by applying a bit line voltage generated from the voltage generator 510.

The row decoder/word line driver 508 may be configured to be controlled by the control logic 512, select/deselect the memory block 304 of the memory cell array 301, and select/deselect the word line 318 of the memory block 304. The row decoder/word line driver 508 may be further configured to drive the word line 318 using a word line voltage generated from the voltage generator 510. In some implementations, the row decoder/word line driver 508 may also select/deselect and drive the BSG line 315 and the TSG line 313. As described below in detail, the row decoder/word line driver 508 is configured to perform the program operation on the memory cells 306 that are coupled to (one or more) selected word lines 318. The voltage generator 510 may be configured to be controlled by the control logic 512 and generate a word line voltage (e.g., a read voltage, a program voltage, a pass voltage, a channel boost voltage, a verify voltage, etc.), a bit line voltage, and a source line voltage to be supplied to the memory cell array 301.

The control logic 512 may be coupled to each of other portions in the peripheral circuit described above, and configured to control operations of each of the other portions in the peripheral circuit. The register 514 may be coupled to the control logic 512 and include a state register, a command register, and an address register for storing state information, a command operation code (OP code), and a command address for controlling the operation of each peripheral circuit. The interface 516 may be coupled to the control logic 512, and act as a control buffer to buffer and relay control commands received from a host (not shown) to the control logic 512 and buffer and relay state information received from the control logic 512 to the host. The interface 516 may also be coupled to the column decoder/bit line driver 506 via the data bus 518 and act as a data I/O interface and a data buffer to buffer and relay the data to and from the memory cell array 301.

The basic principle of the three-dimensional NAND memory is that carriers (electrons or holes) cross a charge barrier to inject a certain amount of charges into a memory cell to complete the process of writing data, and then the stored data may be read according to a threshold voltage when the memory cell is on. Therefore, in order to read correct data, an error correction algorithm with strong error correction capability and high efficiency is introduced when the data is read.

However, with the increase of the use time, the charges stored in the memory cell vary with increased use time, repeated read operations, crossover temperatures, etc., thus affecting the correctness of data reading. When the threshold voltage is obviously offset upward or downward, and when an existing read voltage is employed to read the data of the memory cell, the possibility of a read error is very high; and when the read error exceeds the error correction capability, the reading of the data of the memory cell fails.

Figure 6:
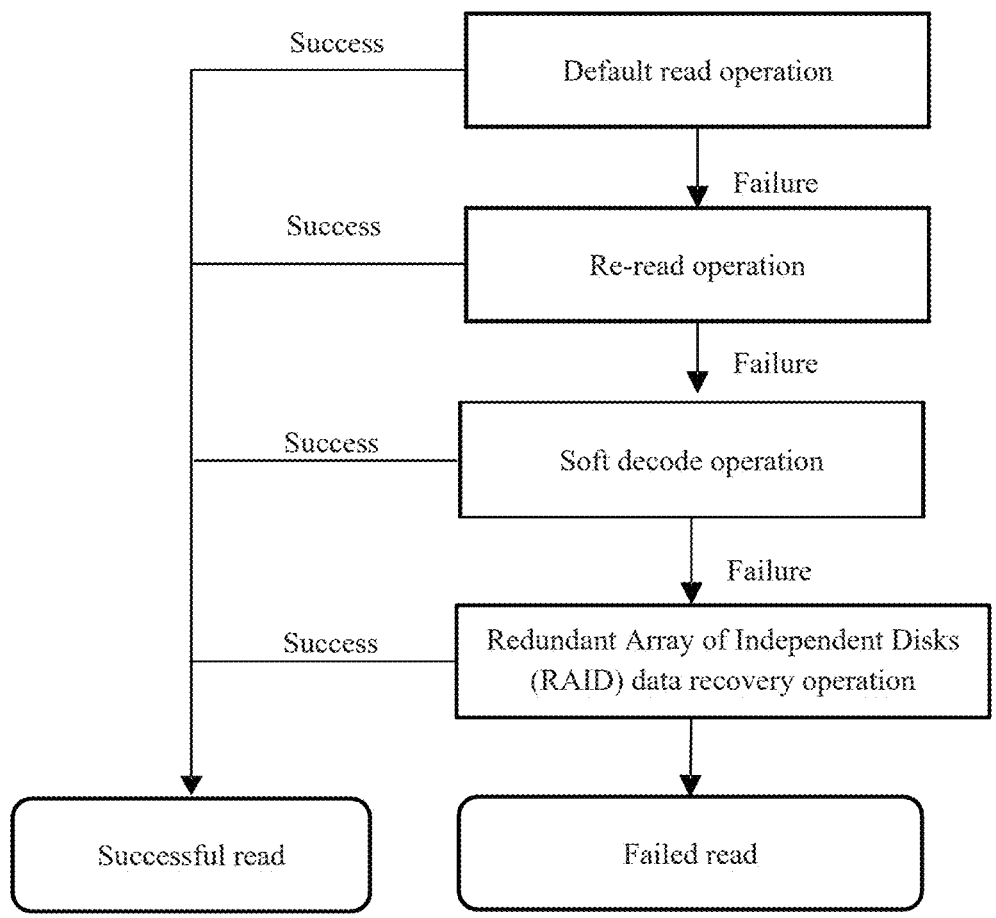
FIG. 6 is a schematic diagram of an example read operation flow of a memory system provided by the present disclosure.

FIG. 6 shows a schematic diagram of an example read operation flow of a memory system. Referring to FIG. 6, when the memory controller controls the memory device to perform the read operation, an default read (FW default read) operation is first performed on the memory cell of a respective physical address; a read retry operation is performed after the default read operation fails; a soft decode operation is performed after the read retry operation fails; an Redundant Array of Independent Disks (RAID) data recovery operation is performed after the soft decode operation fails; the read operation stops after the RAID data recovery operation fails, and the read fails due to incapability of error correction; and the memory controller sends a read fail signal to the host 108. The read retry operation and the default read operation are applicable to hard decode.

In some implementations, the read retry operation may be performed through querying in a retry table provided by a manufacturer. The essence of the read retry operation is an error correction mechanism. The retry table may provide a reference voltage for data reading. Through querying in the retry table, an attempt to re-read each memory cell with a read voltage deviating from the normal threshold voltage is performed, which, in conjunction with error correction using the error correction algorithm, implements an attempt on correct data reading. The read retry table is stopped to be queried if the data with an error is corrected. The read retry table is kept querying if the data with the error is not corrected, until the entire read retry table is traversed.

The mode of the read retry operation needs to query the read retry table item by item, such that the number of trial errors is increased accordingly, which takes more time. Furthermore, the read retry table provided by the manufacturer only includes some reference values in a particular environment, but a real application scenario is ever-changing, such that the read retry table provided by the manufacturer cannot cover many scenarios. In this case, the data might not be corrected by traversing the read retry table, which causes an increase in process-command time. In other words, it takes more time by using the mode of repeatedly polling the read retry table for the read retry operation, thereby affecting response time of subsequent commands, and thus negatively impacting the performance of a device.

Based on one or more problems described above, according to a first aspect, examples of the present disclosure provide a memory device.

Figure 7:
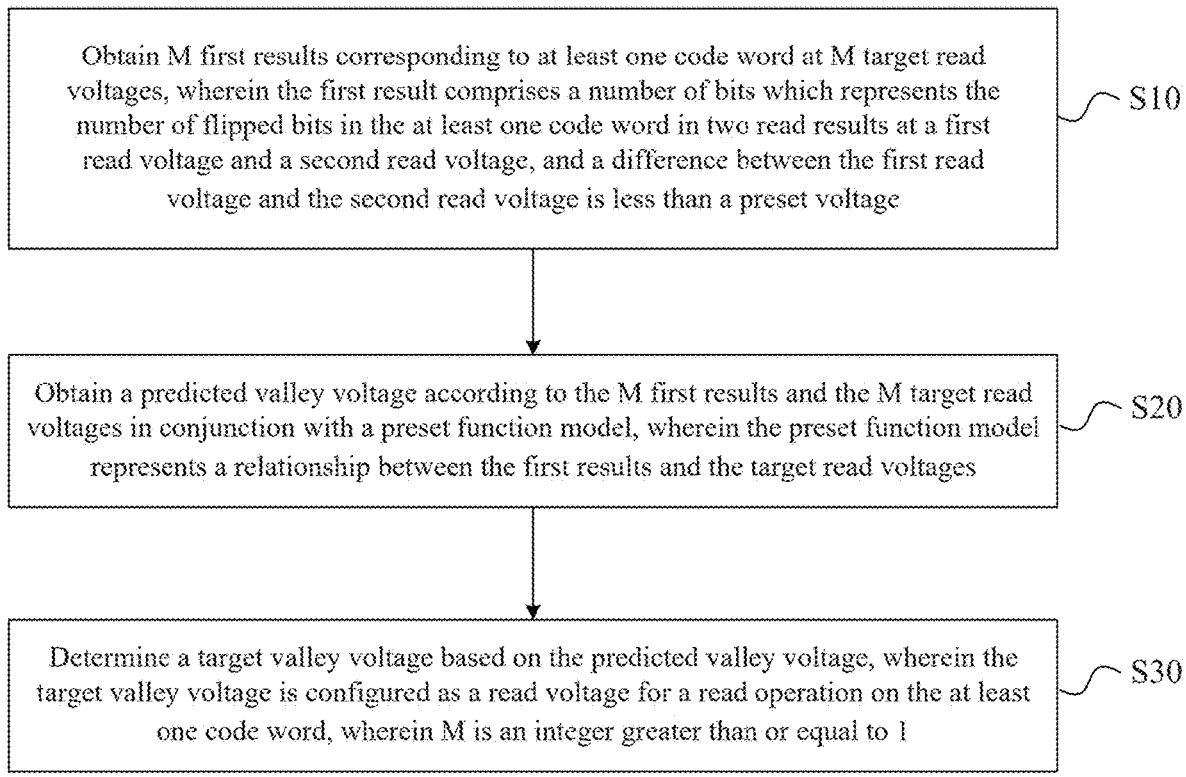
FIG. 7 is an implementation flow diagram of an operation method configured to be executed by a peripheral circuit of a memory device provided by an example of the present disclosure.

As shown in FIG. 7, the memory device includes: a memory cell array including a plurality of memory cells, where a preset number of the memory cells forming a code word; and a peripheral circuit coupled with the memory cell array and configured to perform operations S10, S20, and S30.

For instance, at operation S10, M first results corresponding to at least one code word at M target read voltages may be obtained. The first result includes a number of bits which represents the number of flipped bits in the at least one code word in two read results at a first read voltage and a second read voltage. A difference between the first read voltage and the second read voltage is less than a preset voltage.

At operation S20, a predicted valley voltage according to the M first results and the M target read voltages in conjunction with a preset function model may be obtained. The preset function model represents a relationship between the first result and the target read voltage.

At operation S30, a target valley voltage based on the predicted valley voltage may be determined. The target valley voltage is configured as a read voltage for a read operation on the at least one code word; and M is an integer greater than or equal to 1.

It is to be noted that the predicted valley voltage here may be used directly as the target valley voltage to perform the read operation on the data to be read as required, or be further processed to obtain the target valley voltage. An example manner of obtaining the predicted valley voltage will be further described herein below.

Herein, a structure of the memory device is referred to FIG. 3 describe above, and is not described herein again.

In some examples, the memory device includes the memory cell array. The memory cell array includes the plurality of memory blocks. Each memory block may include a plurality of word lines. The plurality of memory cells may be coupled to each word line. All memory cells coupled to one word line form one physical page. The preset number of memory cells forms one code word (CW). One physical page includes one or more code words.

In some examples, the number of memory cells included in one code word is the same as the number of memory cells included in one time of coding or decoding during error correction coding or decoding. In some examples, the number of memory cells included in one code word may be less than or equal to the number of memory cells coupled with one physical page, for example, the number of memory cells included in one code word is ¼ of the number of memory cells coupled with one physical page. In some examples, the code word may include the number of memory cells ranging from $2^4$ to $2^{12}$. In an example, the code word may include $2^4$, $2^8$, or $2^{12}$ memory cells.

Overall, different memory systems may choose different sizes of code words to meet performance, reliability, and storage demands thereof. The memory cells (e.g., MLC, TLC, or QLC) in different types of the memory devices may store different numbers of bits. It can be understood that the code word may include the plurality of memory cells, and the number of the memory cells included in the code word may be adjusted according to actual situations.

It is to be noted that, in actual, the code word may have some extra reserved spaces for management and error correction, such that the number of the memory cells actually required may slightly exceed the above-mentioned calculation result.

Here, the target valley voltage is used as the read voltage for the read operation on the at least one code word. The manner of obtaining the target valley voltage according to a finite number of target read voltages and first results in conjunction with the preset function model in the memory device may reduce the number of loop iterations and allow for quicker determination of the target valley voltage.

The meaning of the first result and a manner of obtaining the first result are described below.

Here, the first result represents a number of bits flipped in two read results of the code word on which the read operation is to be performed at the first read voltage and the second read voltage.

In some examples, during a read of the memory device, one read operation reads data of one physical page. When the number of memory cells included in one code word may be less than the number of memory cells coupled with one physical page, the code word may be a unit executable in acquisition of the first result, without excluding the case of a plurality of code words. That is to say, the first result corresponding to at least one code word at the target read voltage may be obtained here. For example, one physical page may correspond to 4 code words, a page buffer hardware operation may count respective fail-bit counts (FBCs) of the 4 code words at one time, then the FBCs of the four code words are summed to obtain an FBC of the physical page, and subsequent calculation uses values after addition. It may be understood that the first result here may be data based on one physical page, and the one physical page may correspond to a plurality of code words.

In some examples, the memory cell array includes a memory cell with P storage bits. The P storage bits respectively correspond P pages. The P-bit memory cell reads P-bit storage data through a Q-level read voltage, where P and Q both are integers greater than 1, and $Q=2^P-1$.

Figure 8A:
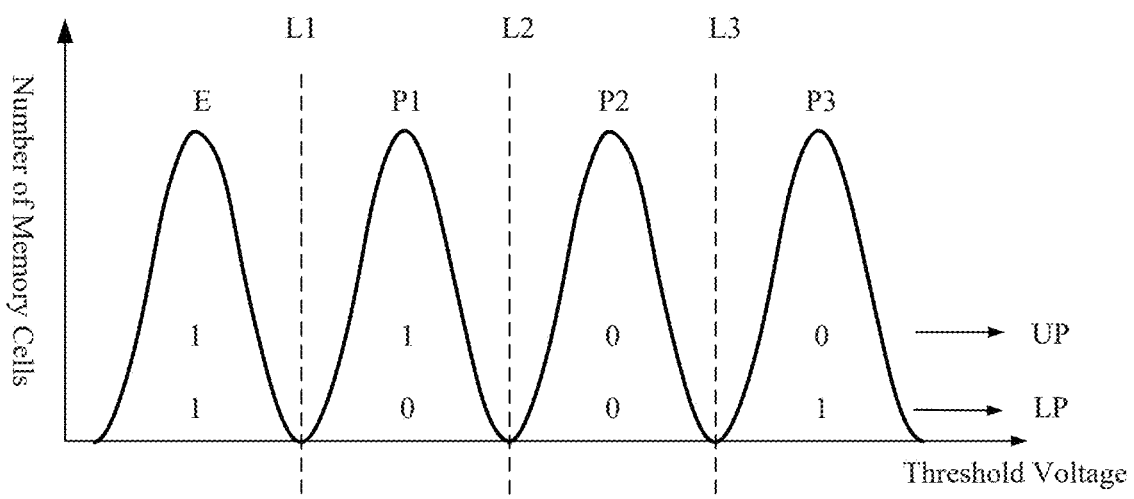
FIG. 8A is schematic diagram of a threshold voltage distribution corresponding to the memory cell including 2 storage bits provided by an example of the present disclosure.

In an example, when the number of storage bits of the memory cell is 2, a corresponding memory state includes a 0th state to a 4th state. With reference to FIG. 8A, the 4 states are respectively the 0th state (also referred to as an erased state) E, the $1^{st}$ state (also referred to as a $1^{st}$ memory state) P1, the $2^{nd}$ state (also referred to as a $2^{nd}$ memory state) P2, and the $3^{rd}$ state (also referred to as a $3^{rd}$ memory state) P3. Binary data corresponding to the 4 states are respectively 11, 10, 00, and 01. Correspondingly, the memory device includes two pages, which are respectively a lower page (LP) and an upper page (UP).

A memory cell shown in FIG. 8A is used as an example. A two-bit memory cell reads through a 3-level read voltage (a first-level read voltage L1, a second-level read voltage L2, and a third-level read voltage L3 shown in FIG. 8A), two-bit four-state storage data of the two-bit memory cell.

In an example, one page corresponds to a multi-level read voltage, and the other page corresponds to a one-level read voltage. As shown in FIG. 8A, the binary data corresponding to the lower page are 1001, and a corresponding first-level read voltage L1 and a corresponding third-level read voltage L3 are required to read the lower page. The binary data corresponding to the upper page are 1100, and a corresponding second-level read voltage L2 is required to read the upper page.

Figure 8B:
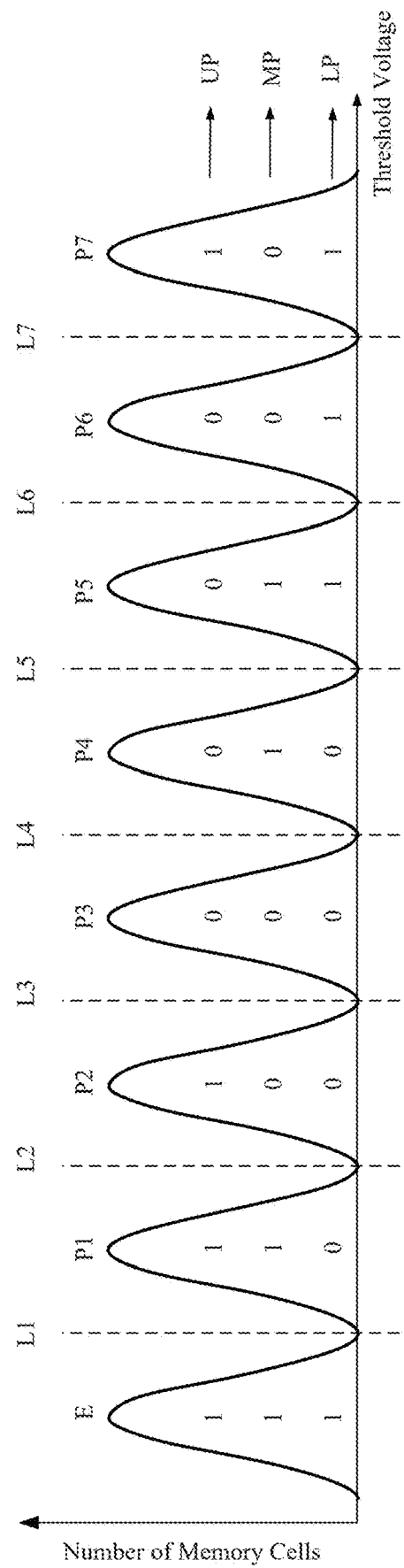
FIG. 8B is schematic diagram of a threshold voltage distribution corresponding to the memory cell including 3 storage bits provided by an example of the present disclosure.

In an example, when there are three storage bits in the memory cell, corresponding memory states include zeroth to seventh states. Referring to FIG. 8B, the eight states are a zeroth state (also referred to as an erase state) E, a first state (also referred to as a first memory state) P1, a second state (also referred to as a second memory state) P2, . . . and a seventh state (also referred to as a seventh memory state) P7 respectively, and binary data corresponding to the eight states are 111, 110, 100, 000, 010, 011, 001, and 101 respectively. Accordingly, the memory device includes three pages, which are a lower page, a middle page (MP) and an upper page respectively.

Taking the memory cell shown in FIG. 8B as an example, the three-bit, eight-state storage data of the three-bit memory cell is read through seven levels of read voltages (a first-level read voltage L1, a second-level read voltage L2, a third-level read voltage L3, a fourth-level read voltage L4, a fifth-level read voltage L5, a sixth-level read voltage L6, and a seventh-level read voltage L7 shown in FIG. 8B).

In an example, each of the pages corresponds to multi-level read voltages. As shown in FIG. 8B, the binary data corresponding to the lower page are 10000111 respectively, and a read of the lower page requires the corresponding first-level read voltage L1 and the fifth-level read voltage L5. The binary data corresponding to the middle page are 11001100 respectively, and the read of the middle page requires the corresponding second-level read voltage L2, the fourth-level read voltage L4, and the sixth-level read voltage L6. The binary data corresponding to the upper page are 11100001 respectively, and the read of the upper page requires the corresponding third-level read voltage L3 and the seventh-level read voltage L7.

Figure 8C:
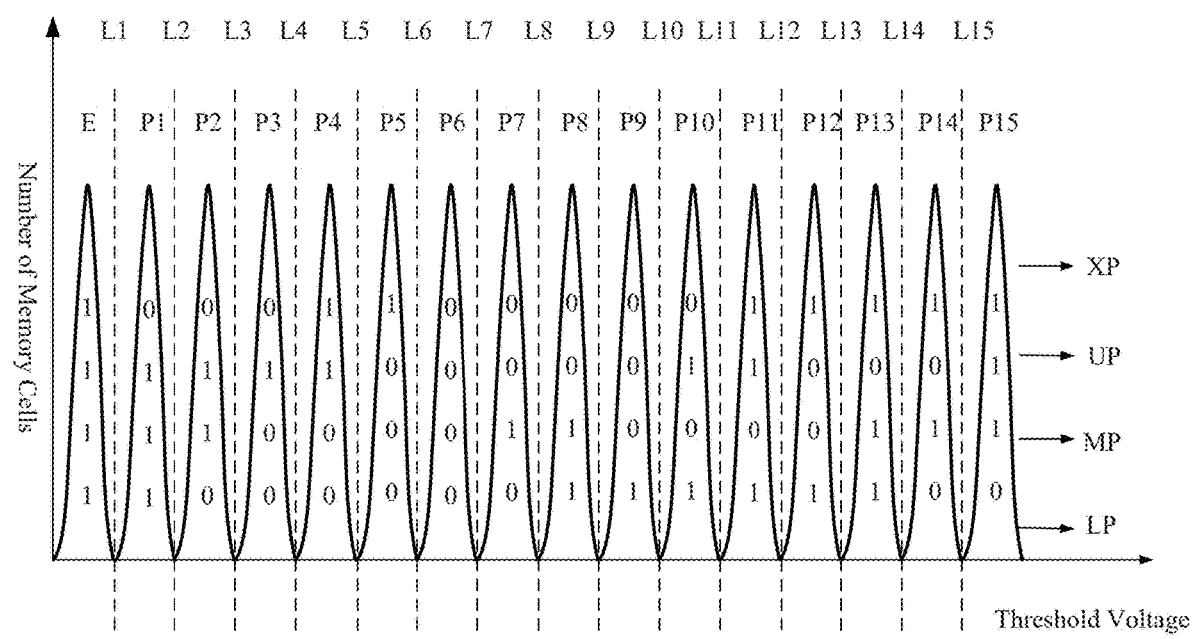
FIG. 8C is schematic diagram of a threshold voltage distribution corresponding to the memory cell including 4 storage bits provided by an example of the present disclosure.

In an example, when there are four storage bits in the memory cell, corresponding memory states include zeroth to fifteenth states. Referring to FIG. 8C, the 16 states are a zeroth state (also referred to as an erase state) E, a first state (also referred to as a first memory state) P1, a second state (also referred to as a second memory state) P2, . . . and a fifteenth state (also referred to as a fifteenth memory state) P15 respectively, and binary data corresponding to the 16 states are 1111, 0111, 0110, . . . and 1110 respectively. Accordingly, the memory device includes four pages, which are a lower page, a middle page, an upper page, and an extra page (XP) respectively. Here, the four storage bits corresponding to the 16 states are stored in the lower page, the middle page, the upper page, and the extra page respectively.

Taking the memory cell shown in FIG. 8C as an example, the four-bit, sixteen-state storage data of the four-bit memory cell is read through 15 levels of read voltages (a first-level read voltage L1, a second-level read voltage L2, a third-level read voltage L3, a fourth-level read voltage L4, a fifth-level read voltage L5, a sixth-level read voltage L6, a seventh-level read voltage L7, an eighth-level read voltage L8, a ninth-level read voltage L9, a tenth-level read voltage L10, an eleventh-level read voltage L11, a twelfth-level read voltage L12, a thirteenth-level read voltage L13, a fourteenth-level read voltage L14, and a fifteenth-level read voltage L15 shown in FIG. 8C).

In an example, each of the pages corresponds to multi-level read voltages. As shown in FIG. 8C, the binary data corresponding to the lower page are 1100000011111100 respectively, and the read of the lower page requires the corresponding second-level read voltage L2, the eighth-level read voltage L8, and the fourteenth-level read voltage L14. The binary data corresponding to the middle page are 1110000110000111 respectively, and the read of the middle page requires the corresponding third-level read voltage L3, the seventh-level read voltage L7, the ninth-level read voltage L9, and the thirteenth-level read voltage L13. The binary data corresponding to the upper page are 1111100000110001 respectively, and the read of the upper page requires the corresponding fifth-level read voltage L5, the tenth-level read voltage L10, the twelfth-level read voltage L12, and the fifteenth-level read voltage L15. The binary data corresponding to the extra page are 1000110000011111 respectively, and the read of the extra page requires the corresponding first-level read voltage L1, the fourth-level read voltage L4, the sixth-level read voltage L6, and the eleventh-level read voltage L11.

The lower page is the closest to a source/drain, such that the target valley voltage of each of the levels of read voltages corresponding to the lower page is determined firstly, which has the fastest access speed and shortest response time, and can guarantee the balance performance and durability during a data access process.

It is to be noted that the manner of firstly determining the target valley voltage of each of the levels of read voltages corresponding to the lower page is merely an example, and is not intended to limit an order of determining the target valley voltage of each of a plurality of levels of read voltages corresponding to at least part of the pages in the examples of the present disclosure.

Herein, the first read voltage and the second read voltage both are generalized concepts, and a difference between the first read voltage and the second read voltage is less than the preset voltage. In some examples, the second read voltage is greater than the first read voltage, and the difference between the first read voltage and the second read voltage is set to a range from 5 mV to 20 mV, and in an example, the difference between the first read voltage and the second read voltage may be 5 mV, 10 mV, 15 mV, or 20 mV. In some other examples, the second read voltage is less than the first read voltage, and the difference between the first read voltage and the second read voltage ranges from −5 mV to −20 mV. In an example, the between the first read voltage and the second read voltage may be −5 mV, −10 mV, −15 mV, or −20 mV.

In some examples, the peripheral circuit is configured to: read storage data of at least one code word at the first read voltage, to obtain a second result; read the storage data of the at least one code word at the second read voltage, to obtain a third result; perform a logic operation on the second result and the third result, to obtain a fourth result; and count a number of bits in the fourth result that represent flip of bits in the third result compared to the second result, to obtain the first result.

In some examples, the peripheral circuit includes: a first latch, a second latch, and a third latch; the first latch is configured to store the second result; the second latch is configured to store the third result; the third latch is configured to store the fourth result.

Here, the first read voltage and the second read voltage are related before and after, that is to say, the second read voltage is obtained by performing third adjustment according to the first read voltage. Based on this, a voltage difference between the first read voltage and the second read voltage is the third step size. In some examples, the first step size ranges from 5 mV to 20 mV. In an example, the third step size may be 5 mV, 10 mV, 15 mV, or 20 mV. The preset voltage is related to the third step size, and may be a voltage slightly greater than the third step size. In some examples, the preset voltage is set to a range from 6 mV to 21 mV, and in an example, the preset voltage may be 6 mV, 11 mV, 16 mV, or 21 mV. In some other examples, the preset voltage is set to a range from −6 mV to −21 mV, and in an example, the preset voltage may be −6 mV, −10 mV, −16 mV, or −21 mV.

As set forth above, the first read voltage and the second read voltage are both generalized concepts. The target read voltage and read voltages obtained after a first adjustment and a second adjustment on the target read voltage each can be referred to as the first read voltage, and a read voltage obtained after a third adjustment on the first read voltage may be referred to as the second read voltage. That is, the first read voltage is a general concept, and may be understood as the target read voltage or a target adjustment read voltage (a voltage obtained after an adjustment on the target read voltage with a target step size, where a range of the target step size may be set to 20 mV to 40 mV, and in an example, a first step size of the first adjustment may be 20 mV, 30 mV, or 40 mV. The range of the target step size may also be set to 50 mV to 150 mV, and in an example, a second step size of the second adjustment may be 50 mV, 60 mV, 70 mV, 80 mV, 100 mV, 120 mV, or 150 mV).

In the examples of the present disclosure, the first result corresponding to a certain voltage (e.g., the first read voltage V0 shown in FIG. 9) may be understood as follows: when the third adjustment is performed on the certain voltage, that is, there is a first voltage difference $\Delta V1$ between the certain voltage and a voltage (e.g., the second read voltage V1 shown in FIG. 9) resulting from the third adjustment on the certain voltage, a number of bits flipped in two read results of a preset number of memory cells at the certain voltage and the voltage resulting from the third adjustment on the certain voltage may be used as the first result corresponding to the certain voltage, where the preset number of memory cells may form at least one code word.

In some examples, prior to obtaining the first result corresponding to the at least one code word at the target read voltage, a read mode of the memory device is set to a Single-Level Read (SLR) mode, where the SLR mode includes reading at least one bit of storage data stored in the memory cell with one level of read voltage.

In some examples, the memory device is configured to: enter the single level read mode in response to a mode setting command, and obtain the first result corresponding to the at least one code word at the target read voltage in the single level read mode.

Figure 9:
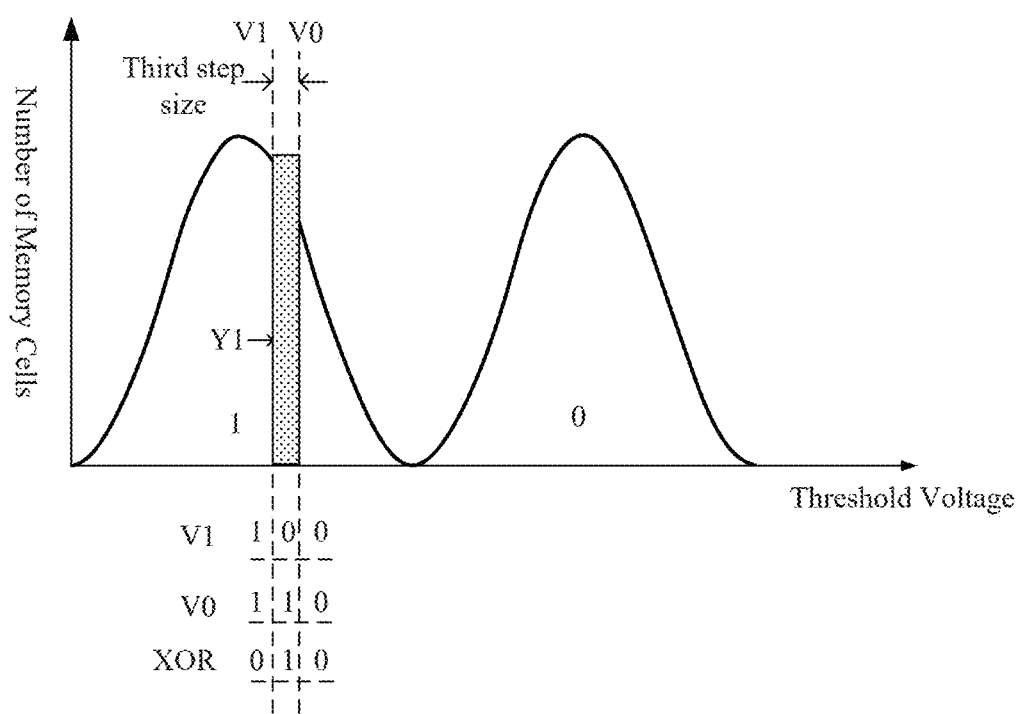
FIG. 9 is a schematic diagram of distribution of threshold voltages of the memory cell, when a first result is obtained, provided by an example of the present disclosure.

In some examples, storage data of the code word is read at the first read voltage to obtain a second result; and the second result is stored in the first latch of the memory device. In an example, as shown in FIG. 9, the storage data of at least one code word is read at the first read voltage V0 to obtain the second result. In an example, a memory cell of which a threshold voltage is less than the target read voltage V0 is labeled as bit 1, and the memory cell of which the threshold voltage greater than the target read voltage V0 is labeled as bit 0, to obtain the second result; and the second result is stored in the first latch of the memory device.

Next, a third adjustment is performed on the first read voltage to obtain the second read voltage, and the storage data of the at least one code word is read at the second read voltage to obtain a third result; and the third result is stored in the second latch of the memory device. In an example, as shown in FIG. 9, the third adjustment is performed on the first read voltage V0, and the storage data of the code word is read at the second read voltage V1 obtained after adjustment, so as to obtain the third result. In an example, the memory cell of which the threshold voltage is less than the second read voltage V1 is labeled as bit 1, and the memory cell of which the threshold voltage is greater than the second read voltage V1 is labeled as bit 0, so as to obtain the third result; and the third result is stored in the second latch of the memory device.

Next, a logical operation is performed on the second result and the third result to obtain a fourth result; and the fourth result is stored in the third latch of the memory device. In an example, as shown in FIG. 9, an exclusive or operation is performed on the second result and the third result to obtain the fourth result; and the fourth result is stored in the third latch of the memory device.

It is to be noted that, the exclusive or operation is one of basic logical operations; in binary, if two binary numbers in a same position are the same, the result is "0"; and if the two binary numbers in the same position are different, the result is "1" (e.g., the same is 0, and the different is 1).

Next, the first result is obtained by counting a number of bits in the fourth result that represent the flip of bits in the third result compared to the second result. In an example, as shown in FIG. 9, a portion with a bit being 1 in the fourth result represents a number of memory cells each having different threshold voltages between the first read voltage V0 and the second read voltage V1. In other words, the portion with the bit being 1 in the fourth result represents a number of bits flipped in two read results of the code word at the first read voltage V0 and the second read voltage V1, and the number is denoted as the first result Y1 corresponding to the first read voltage V0.

It is to be noted that the first result is also referred to as FBC in the examples of the present disclosure.

In some examples, the preset function model is related to characteristics of the memory device, and the preset function model may be obtained by fitting many experimental results before the memory device leaves the factory and stored in the memory device.

In an example, the preset function model is encoded into a code, and the code is stored in the firmware or software of the memory device.

In some examples, a mass of data is collected through many experiments before the memory device leaves the factory. The data may be analyzed through preprocessing such as removing abnormal values, sorting, denoising, etc. The preset function model is fitted using a statistical method, machine learning or other modeling techniques to describe a relationship between a target read voltage and a first result.

In an example, the preset function model is fitted using a regression analysis method and by collecting lots of target read voltages and corresponding first results.

In an example, the preset function model is established using a data-driven method such as machine learning or deep learning or the like and with the collected lots of target read voltages and corresponding first results to represent a relationship between a target read voltage and a first result.

In some examples, the preset function model includes a quadratic function model including the following function relation:

$$y = a(x+b)^2 + c,$$

where y is the first result; x is the target read voltage; b is to represent a prediction parameter; a is a first parameter; and c is a second parameter.

Figure 10:
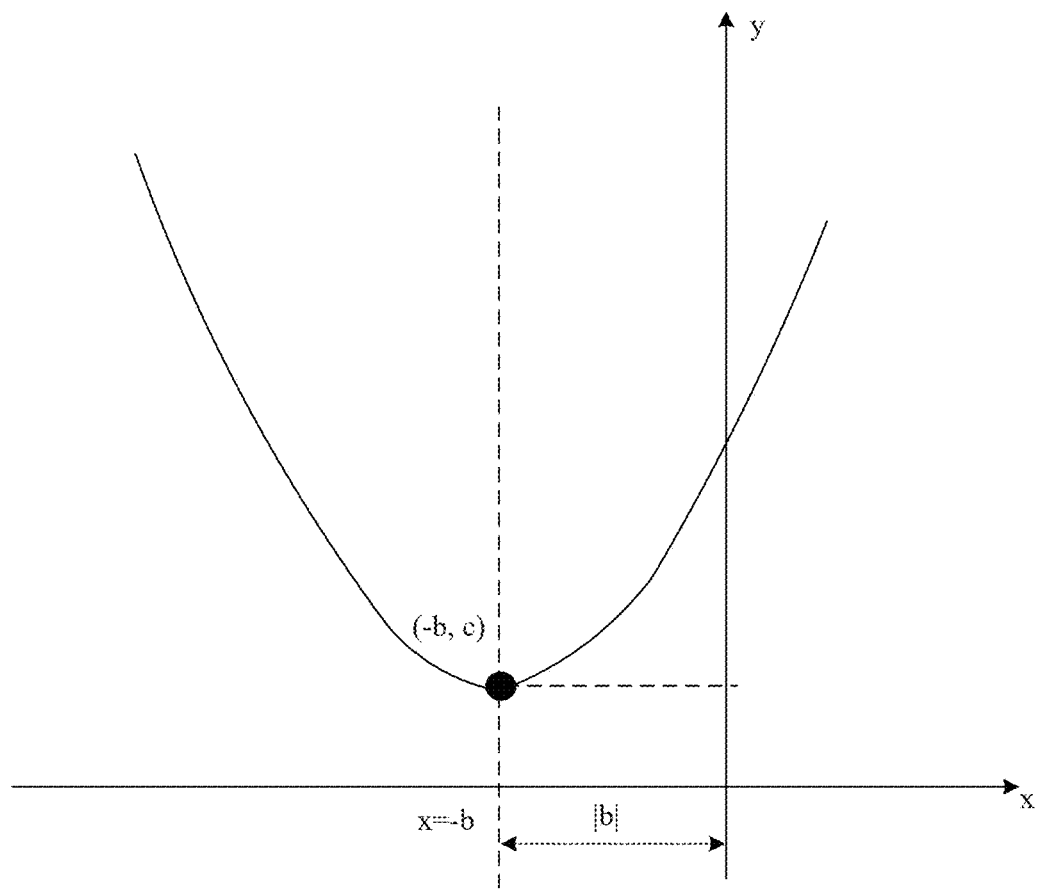
FIG. 10 is a schematic diagram of a preset function model provided by an example of the present disclosure.

As shown in FIG. 10, as can be known in conjunction with the functional relation that the quadratic function model includes, an extremum of a curve that the quadratic function model is in is at a position where an axis of symmetry is x=−b, e.g., a position where a derivative of the curve that the quadratic function model is in is 0. In an example, when the first parameter is greater than 0, the corresponding y value (the first result) at x=−b is a minimum value of the curve that the quadratic function model is in, and the coordinates of this extreme point (the black solid point shown in FIG. 10) are (−b, c).

In some implementations, a value of the prediction parameter is an opposite number of b, e.g., the prediction parameter represents a horizontal coordinate corresponding to the minimum value of the curve that the quadratic function model is in.

As shown in FIG. 10, an offset value of the axis of symmetry (at x=−b) of the curve that the quadratic function model is in compared to the y axis (at x=0) is −b, e.g., a distance between the axis of symmetry of the curve that the quadratic function model is in and the y axis is an absolute value |b| of b.

Here, x=0 may be construed as the position of a default read voltage. The default read voltage may be the read voltage when the threshold voltage of the memory cell is not offset, e.g., the corresponding read voltage right after writing, and at this time, the corresponding offset value is 0. It will be appreciated that the corresponding first result at the target read voltage is the minimum value when the offset value of the target read voltage compared to the default read voltage (x=0) is −b. It will be appreciated that the corresponding target read voltage (equivalent to the prediction parameter here) when the first result is the minimum value is used as the predicted valley voltage and the target valley voltage is determined based on the predicted valley voltage. The read result is low in error rate and high in reliability.

It is to be noted that when there is one and only one set of prediction parameters, the prediction parameter is directly used as the predicted valley voltage. However, when there are a plurality of sets of prediction parameters, the predicted valley voltage needs to be determined according to the plurality of sets of prediction parameters together.

In some examples, the peripheral circuit is configured to: obtain N sets of prediction parameters according to the M first results, the M target read voltages and the quadratic function model, where $$N = C_M^i,$$

i being an integer, and 1≤i≤M; and obtain the predicted valley voltage according to the N sets of prediction parameters.

In an example, according to the manner of obtaining the first result in the foregoing examples, M first results corresponding to the at least one code word at M target read voltages are obtained.

When M is greater than or equal to 2, a voltage difference between the M target read voltages may be equal to the step size of the first adjustment, or may be equal to the step size of the second adjustment.

In some examples, i is equal to 1, and both of the first parameter and the second parameter are constants; and the peripheral circuit is configured to: obtain the N sets of prediction parameters according to the M first results, the M target read voltages, the quadratic function model, the first parameter and the second parameter.

In an example, when i is equal to 1, N is equal to M.

Here, the first parameter and the second parameter may be obtained when the preset function model is fitted, and is stored in the memory device. In an example, the preset function model includes a quadratic function model, and the quadratic function model includes the following function relation:

$$y = a(x+b)^2 + c.$$

The first parameter and the second parameter in the function relation may be optimized using, but not limited to, a least squares method, a gradient descent method, Bayesian optimization, Newton method and quasi-Newton method, etc., and the optimized first parameter and second parameter are stored in the memory device. The least squares method is a parameter estimation method that minimizes a residual sum of squares of actually collected data and a predicted value of the quadratic function model to estimate a parameter. The gradient descent method looks for parameter values that minimize an error of fitting of the quadratic function model using the parameters of the quadratic function model as optimization objects, calculates a gradient of a loss function with respect to the first parameter and the second parameter, and then updates the values of the first parameter and the second parameter along a reverse direction of the gradient until convergence is reached.

In some examples, i is equal to M; and the peripheral circuit is configured to: obtain one set of prediction parameters according to the M first results, the M target read voltages and the quadratic function model; and take the prediction parameter as the predicted valley voltage.

Figure 11:
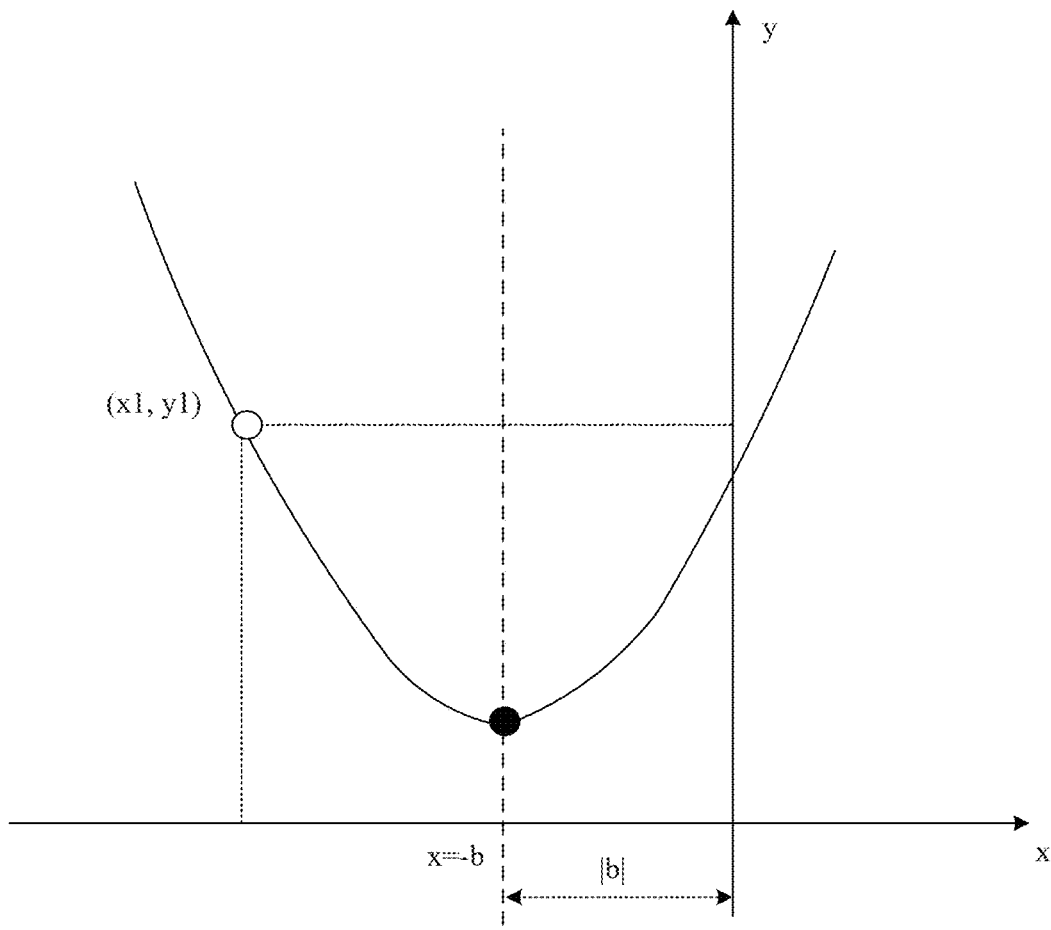
FIG. 11 is a schematic diagram I of determining a predicted valley voltage according to a preset function model provided by an example of the present disclosure.

In some implementations, M is equal to 1. As shown in FIG. 11, one target read voltage and the corresponding first result at the target read voltage are obtained; corresponding coordinates of this point (the hollow point shown in FIG. 11) are (x1, y1). According to the function relation of the quadratic function model and the first parameter and the second parameter as constants, a calculation formula (1) b may be obtained as follows:

$$b = \pm\sqrt{\frac{y1-c}{a}} - x1. \quad (1)$$

As shown in FIG. 11, the distance between the axis of symmetry (at x=b) of the curve that the quadratic function model is in and the y axis is the absolute value |b| of the prediction parameter.

In some examples, each level of read voltage corresponds to a preset function model.

In some implementations, a calculation formula for the prediction parameter is related to at least one of a level of the target read voltage or a use scenario (e.g., a data retention scenario or a read disturb scenario) of the memory device.

In an example, in the data retention scenario, taking TLC as an example, in order to determine the target valley voltage of the seventh-level read voltage L7 of the upper page, e.g., the level of the target read voltage being L7, it may be considered, according to the characteristics of the memory device, that the threshold voltage of a memory cell of the memory device is in a strong left offset state. At this time, the calculation formula (1-1) for b may be as follows:

$$b = -\sqrt{\frac{y1-c}{a}} - x1. \quad (1-1)$$

In an example, in the read disturb scenario, taking TLC as an example, in order to determine the target valley voltage of the seventh-level read voltage L7 of the upper page, e.g., the level of the target read voltage being L7, it may be considered, according to the characteristics of the memory device, that the threshold voltage of a memory cell of the memory device is in a strong left offset state. At this time, the calculation formula (1-1) for b may be as follows:

$$b = -\sqrt{\frac{y1-c}{a}} - x1. \quad (1-1)$$

In an example, in the read disturb scenario, taking TLC as an example, in order to determine the target valley voltage of the first-level read voltage L1 of the lower page, e.g., the level of the target read voltage being L1, it may be considered, according to the characteristics of the memory device, that the threshold voltage of a memory cell of the memory device is in a strong right offset state. At this time, the calculation formula (1-2) for b may be as follows:

$$b = +\sqrt{\frac{y1-c}{a}} - x1. \quad (1-2)$$

It is to be noted that when the offset state of the threshold voltage of the memory cell of the memory device is unknown in an unknown scenario of the memory device, two different values of b need to be obtained according to the calculation formula (1), and then two different prediction parameters are obtained. Two predicted valley voltages are determined based on the two different prediction parameters, respectively. In some implementations, according to the first result corresponding to the predicted valley voltage being less than a preset threshold, the predicted valley voltage is used as the target valley voltage. The present threshold will be detailed below.

As such, the prediction parameter may be calculated by obtaining one target read voltage and the corresponding first result at the target read voltage. The prediction parameter is used as the predicted valley voltage and the target valley voltage is determined based on the predicted valley voltage. The read result is low in error rate and high in reliability.

In some examples, the peripheral circuit is configured to: determine outliers of the N sets of prediction parameters; and take a median or an average value of the remaining prediction parameters after removal of the outliers from the N sets of prediction parameters as the predicted valley voltage.

In some examples, the peripheral circuit is configured to: determine the outliers based on a median and a standard deviation of the N sets of prediction parameters or use a maximum value and a minimum value of the N sets of prediction parameters as the outliers, and take a median or an average value of the remaining prediction parameters after removal of the outliers from the N sets of prediction parameters as the predicted valley voltage.

In some implementations, i is equal to 1, M is greater than 1, and N is equal to M; and M sets of prediction parameters may be obtained based on the M target read voltages and the M first results with reference to the calculation formula (1) for b. The peripheral circuit is configured to: determine outliers of the M sets of prediction parameters; and take a median or an average value of the remaining prediction parameters after removal of the outliers from the M sets of prediction parameters as the predicted valley voltage.

As such, a plurality of sets of prediction parameters may be calculated by obtaining a plurality of target read voltages and a plurality of corresponding first results at the plurality of target read voltages. Outliers of the plurality of sets of prediction parameters are determined and removed to guarantee that the remaining prediction parameters are configured for determining the accuracy and reliability at the predicted valley voltage.

In some examples, i is equal to 2, and the first parameter is a variable, while the second parameter is a constant; and the peripheral circuit is configured to: obtain the N sets of prediction parameters and the first parameter according to the M first results, the M target read voltages, the quadratic function model and the second parameter.

In an example, when i is equal to 2, N is equal to $$C_M^2.$$

Here, the second parameter may be obtained when the preset function model is fitted, and is stored in the memory device.

Figure 12:
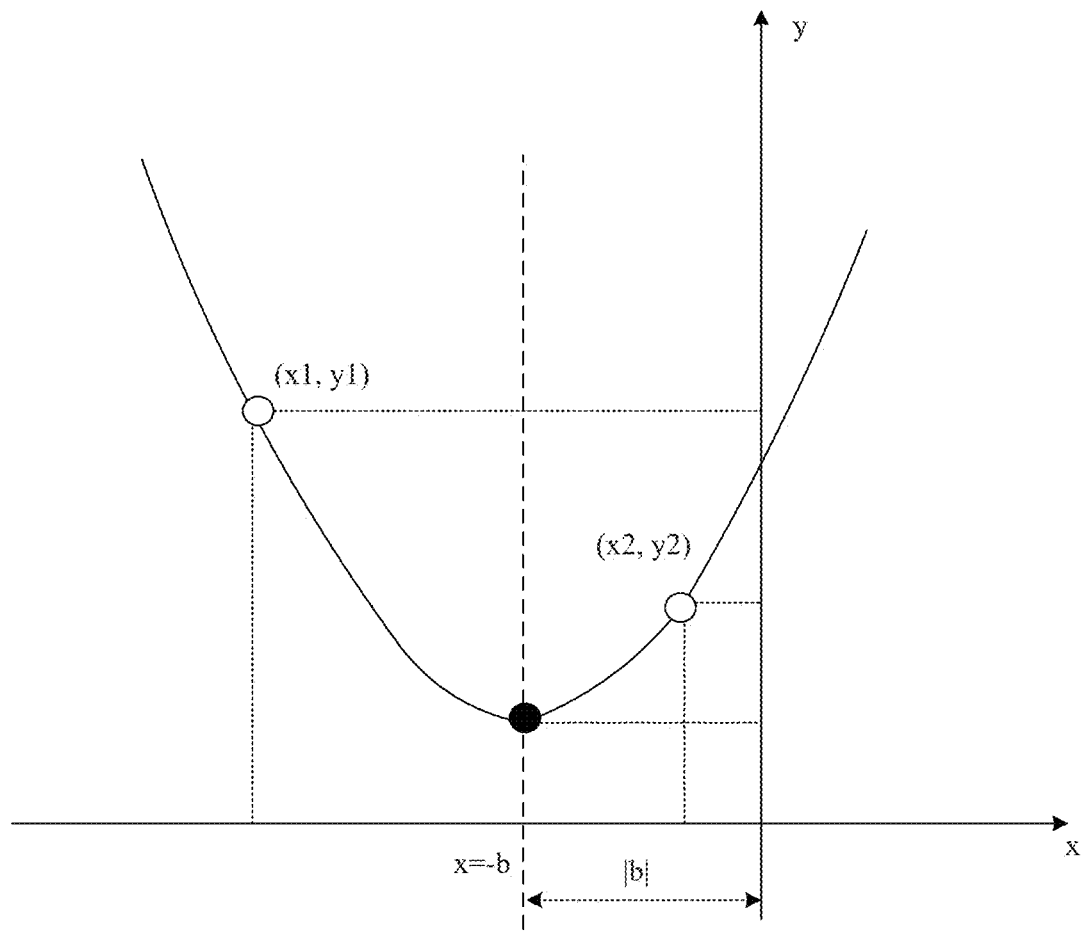
FIG. 12 is a schematic diagram II of determining a predicted valley voltage according to a preset function model provided by an example of the present disclosure.

In some implementations, M is equal to 2, and N is equal to 1. As shown in FIG. 12, two target read voltages and corresponding two first results at the two target read voltages are obtained; corresponding coordinates of the two points (the hollow points shown in FIG. 12) are (x1, y1) and (x2, y2), and according to the function relation of the quadratic function model and the second parameter as the constant, a calculation formula (2) for b may be obtained as follows:

$$b = \frac{x2 - x1}{1 + \sqrt{\frac{y1 - c}{y2 - c}}} - x2. \quad (2)$$

By obtaining two target read voltages and the corresponding first results at the two target read voltages, b may be calculated, and then one group of prediction parameters is obtained, and the prediction parameter is used as the predicted valley voltage.

Based on the calculation formula (2) for b and according to the function relation of the quadratic function model and the second parameter as the constant, a calculation formula (3) for the first parameter may be obtained as follows:

$$a = \frac{y1 - c}{(x1 + b)^2}. \quad (3)$$

In some implementations, i is equal to 2, M is greater than 2, and iv is equal to $$C_M^2;$$

$$C_M^2$$

combination manners of two target read voltages and corresponding two first results thereof may be obtained based on the M target read voltages and the M first results; and $$C_M^2$$

sets of prediction parameters may be obtained based on the $$C_M^2$$

combination manners in conjunction with the calculation formula (2) for b. Outliers of the $$C_M^2$$

sets of prediction parameters are determined; and a median or an average value of the remaining prediction parameters after removal of the outliers from the $$C_M^2$$

sets of prediction parameters is taken as the predicted valley voltage.

In some examples, i is equal to 3, and both of the first parameter and the second parameter are variables; and the peripheral circuit is configured to: obtain the N sets of prediction parameters, the first parameter and the second parameter according to the M first results, the M target read voltages and the quadratic function model.

In an example, when i is equal to 3, N is equal to $$C_M^3.$$

Figure 13:
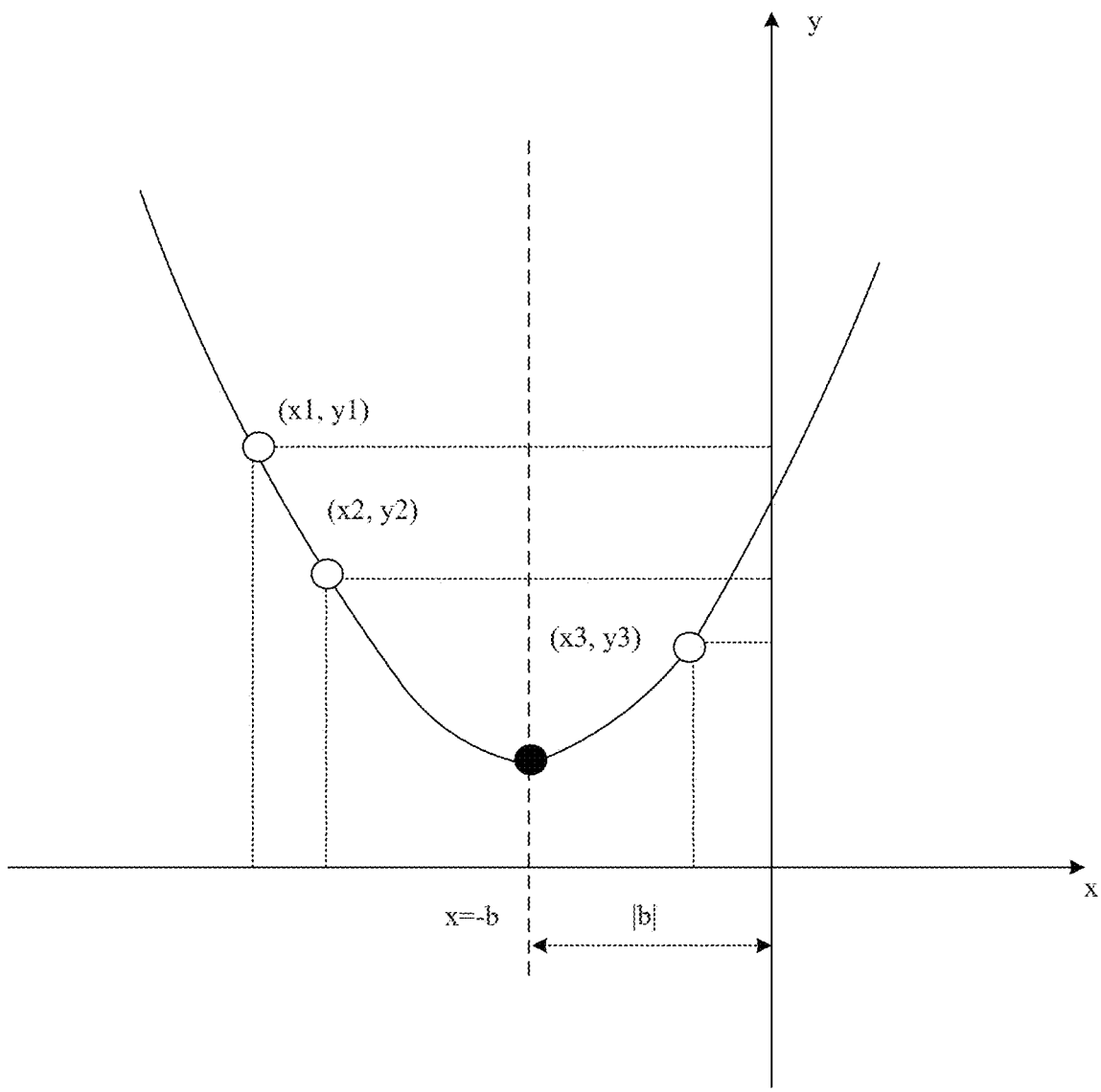
FIG. 13 is a schematic diagram III of determining a predicted valley voltage according to a preset function model provided by an example of the present disclosure.

In some implementations, M is equal to 3, and N is equal to 1. As shown in FIG. 13, three target read voltages and the corresponding three first results at the three target read voltages are obtained; corresponding coordinates of the three points (the hollow points shown in FIG. 13) are (x1, y1), (x2, y2) and (x3, y3), and according to the function relation of the quadratic function model, a calculation formula (4) for b may be obtained as follows:

$$b = \frac{(y2 - y1) \times (x3^2 - x2^2) - (y3 - y2) \times (x2^2 - x1^2)}{2 \times ((y3 - y2) \times (x2 - x1) - (y2 - y1) \times (x3 - x2))}. \quad (4)$$

By obtaining three target read voltages and the corresponding first results at the three target read voltages, b may be calculated, and then one group of prediction parameters is obtained, and the prediction parameter is used as the predicted valley voltage.

Based on the calculation formula (4) for b and according to the function relation of the quadratic function model, a calculation formula (5) for the first parameter may be obtained as follows:

$$a = \frac{y2 - y1}{(x2^2 - x1^2) + 2 \times (x2 - x1) \times b}. \quad (5)$$

A calculation formula (6) for the second parameter may be obtained as follows:

$$c = y1 - a \times (x1^2 + b). \quad (6)$$

In some implementations, i is equal to 3, M is greater than, and iv is equal to $$C_M^3;$$

$$C_M^3$$

combination manners or three target read voltages and corresponding three first results thereof may be obtained based on the M target read voltages and the M first results; and $$C_M^3$$

sets of prediction parameters may be obtained based on the $C_M^3$ combination manners in conjunction with the calculation formula (4) for b. Outliers of the $C_M^3$ sets of prediction parameters are determined; and a median or an average value of the remaining prediction parameters after removal of the outliers from the $C_M^3$ sets of prediction parameters is taken as the predicted valley voltage.

In some examples, the peripheral circuit is configured to: obtain a preset threshold according to a corresponding first result at a first target read voltage of the M target read voltages, where the preset threshold is configured for representing a first result corresponding to a maximum value in an effective range of predicted valley voltage.

In some examples, the first target read voltage of the M target read voltages may be set according to an empirical value (e.g., a read voltage corresponding to a data read success); and may also be a default value which is obtained via extensive simulation experiments and is configured when the memory device leaves the factory, the default value being obtained before the memory device leaves the factory via the extensive simulation experiments. A default read voltage may be a default value which is obtained via extensive simulation experiments and is configured when the memory device leaves the factory.

In the present disclosure, the term "the first result corresponding to the first target read voltage of the M target read voltages" may be briefly referred to as "an initial first result", and the term "the corresponding first result at the default read voltage" may be briefly referred to as "a default first result".

In some examples, the preset threshold is positively correlated with a shift degree, where the shift degree is an absolute value of a difference between the initial first result and the default first result.

Here, the preset threshold is configured for representing a maximum value in a range of predicted effective valley voltages. The preset threshold may be determined according to the first result at the first target read voltage. It may be understood that during the read operation, when the threshold voltage of the memory cell is subjected to a larger offset from the threshold voltage upon writing, the first result read using the first target read voltage is larger as well. On that basis, a value of the first result read at the first target read voltage can be used to determine the preset threshold, where the preset threshold is configured for representing a situation of a change (raise) of the valley voltage due to the offset of the threshold voltage of the memory cell.

It is to be noted that when the first result is less than the preset threshold, it indicates that the target valley voltage may be then determined directly.

In some examples, when the first result is less than the preset threshold, it indicates that the predicted valley voltage corresponding to the first result at this time may be used as the target valley voltage.

Figure 14A:
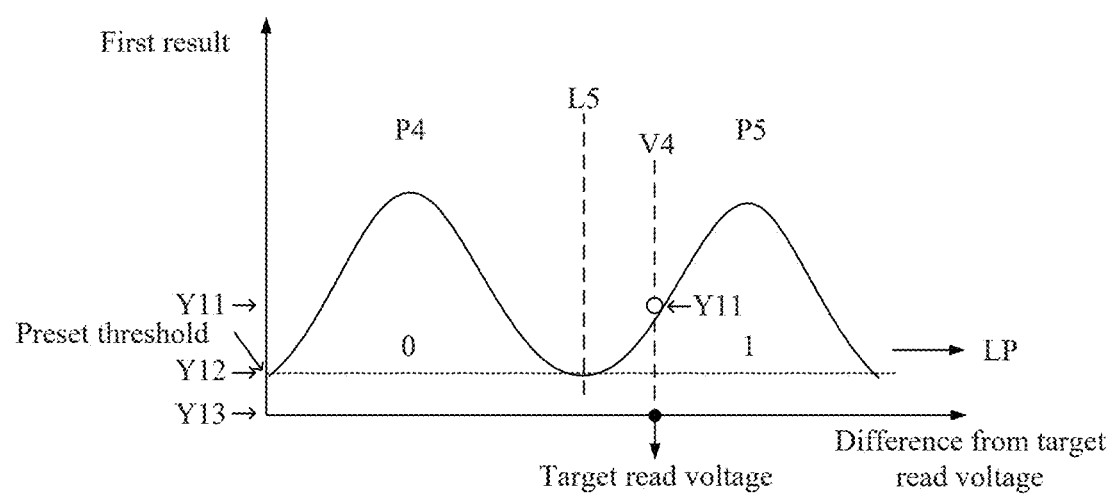
FIG. 14A is a schematic diagram I of a method for determining a preset threshold corresponding to a fifth-level read voltage corresponding to a lower page as shown in FIG. 8B provided by an example of the present disclosure.
Figure 14B:
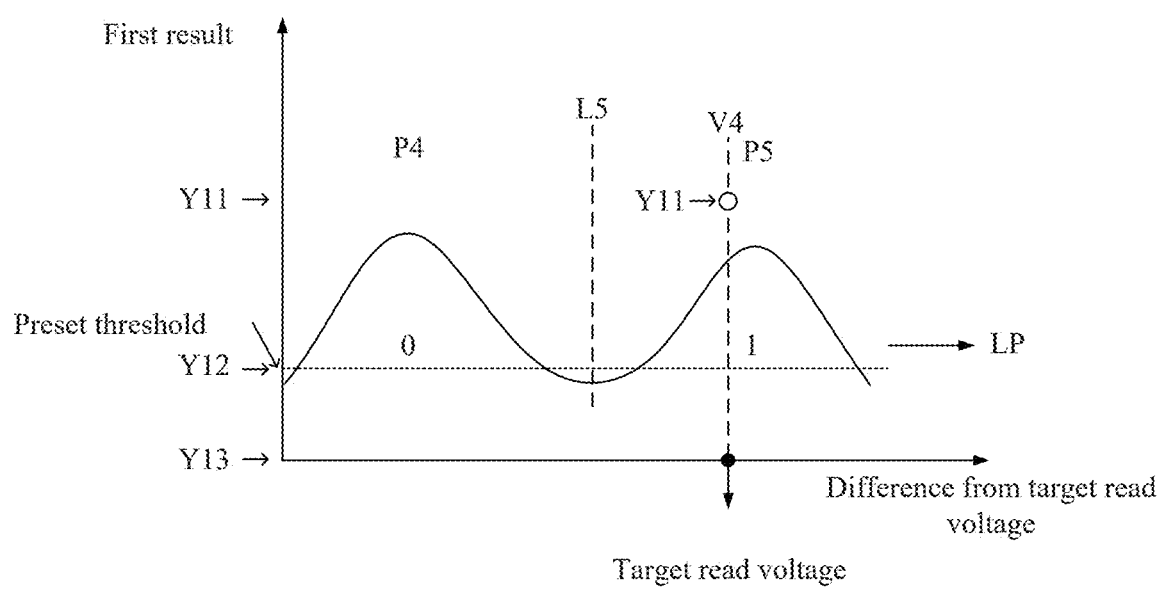
FIG. 14B is a schematic diagram II of the method for determining the preset threshold corresponding to the fifth-level read voltage corresponding to the lower page as shown in FIG. 8B provided by an example of the present disclosure.

In an example, the larger the absolute value of the difference between the initial first result and the default first result, the larger the preset threshold. As a difference between the initial first result Y11 and the default first result Y13 in FIG. 14A is less than a difference between the initial first result Y11 and the default first result Y13 in FIG. 14B, it can be seen that a preset threshold in FIG. 14A (Y12 shown in FIG. 14A) is less than a preset threshold (Y12 shown in FIG. 14B) in FIG. 14B.

In some examples, the peripheral circuit is configured to: take the predicted valley voltage as the target valley voltage according to the first result corresponding to the predicted valley voltage being less than the preset threshold. In an example, as shown in FIG. 9, the peripheral circuit is configured to: take the predicted valley voltage (V0 shown in FIG. 9) as the target valley voltage according to the first result (Y1 shown in FIG. 9) corresponding to the predicted valley voltage (V0 shown in FIG. 9) being less than the preset threshold.

In some examples, the memory cell array includes memory cells each having a plurality of storage bits; the plurality of storage bits correspond to a plurality of pages respectively; at least one of the pages corresponds to a plurality of stages; the plurality of stages include a first stage and a second stage; the read voltage of the second stage is less than the read voltage of the first stage; and the peripheral circuit is configured to: obtain at least one of a predicted valley voltage of the second stage or predicted valley voltages of the remaining first stages having lower read voltages in the plurality of stages according to the predicted valley voltages of the first stage of each of the plurality of pages; and perform a read operation on the at least one code word according to the predicted valley voltage of the first stage and the predicted valley voltage of the second stage of each page.

In some examples, at least one page corresponds to read voltages of a plurality of stages, and the read voltages of the plurality of stages include the read voltage of a first stage and the read voltage of a second stage, where the read voltage of the second stage is less than the read voltage of the first stage. In an example, the read voltage of the first stage may be understood as the highest read voltage in the read voltages of the plurality of stages of each page; and the read voltage of the second stage may be understood as other read voltages, which are less than the highest read voltage, in the read voltages of the plurality of stages of each page.

It is to be noted that, the first stage and the second stage are used for distinguishing the high-level read voltages and the low-level read voltages in the plurality of stages of read voltages corresponding to at least part of the pages; and the low-level read voltages are less than the high-level read voltages. For a memory cell including a plurality of storage bits, one page corresponding to one storage bit may include one or more stages, and one stage may include one or more levels.

In an example, referring to FIG. 8A, the memory device includes the lower page and the upper page, where the lower page corresponds to a plurality of stages including the first level and the third level, and the first-level read voltage L1 is less than the third-level read voltage L3. Here, the third-level read voltage L3 corresponds to the read voltage of the first stage of the lower page (high-level read voltage of the lower page), and the first-level read voltage L1 corresponds to the read voltage of the second stage of the lower page (low-level read voltage of the lower page).

In an example, referring to FIG. 8B, the memory device includes the lower page, the middle page, and the upper page, where each page corresponds to a plurality of stages. A plurality of stages corresponding to the lower page include the first level and the fifth level, and the first-level read voltage L1 is less than the fifth-level read voltage L5. A plurality of stages corresponding to the middle page include the second level, the fourth level, and the sixth level, the second-level read voltage L2 and the fourth-level read voltage L4 are both less than the sixth-level read voltage L6. A plurality of stages corresponding to the upper page include the third level and the seventh level, and the third-level read voltage L3 is less than the seventh-level read voltage L7. Here, the fifth-level read voltage L5, the sixth-level read voltage L6, and the seventh-level read voltage L7 correspond to read voltages of the first stage of the lower page, the middle page, and the upper page respectively, and the first-level read voltage L1, the second-level read voltage L2 and the fourth-level read voltage L4, as well as the third-level read voltage L3 correspond to read voltages of the second stage of the lower page, the middle page, and the upper page respectively.

In an example, referring to FIG. 8C, the memory device includes the lower page, the middle page, the upper page, and the extra page, where each page corresponds to a plurality of stages. A plurality of stages corresponding to the lower page include the second level, the eighth level, and the fourteenth level, and the second-level read voltage L2 and the eighth-level read voltage L8 are both less than the fourteenth-level read voltage L14. A plurality of stages corresponding to the middle page include the third level, the seventh level, the ninth level, and the thirteenth level, and the third-level read voltage L3, the seventh-level read voltage L7, and the ninth-level read voltage L9 are all less than the thirteenth-level read voltage L13. A plurality of stages corresponding to the upper page include the fifth level, the tenth level, the twelfth level, and the fifteenth level, and the fifth-level read voltage L5, the tenth-level read voltage L10, and the twelfth-level read voltage L12 are less than the fifteenth-level read voltage L15. A plurality of stages corresponding to the extra page include the first level, the fourth level, the sixth level, and the eleventh level, and the first-level read voltage L1, the fourth-level read voltage LA, and the sixth-level read voltage L6 are less than the eleventh-level read voltage L11. Here, the fourteenth-level read voltage L14, the thirteenth-level read voltage L13, the fifteenth-level read voltage L15, and the eleventh-level read voltage L11 correspond to the read voltages of the first stage of the lower page, the middle page, the upper page, and the extra page respectively; the second-level read voltage L2 and the eighth-level read voltage L8 correspond to the read voltages of the second stage of the lower page; the third-level read voltage L3, the seventh-level read voltage L7, and the ninth-level read voltage L9 correspond to the read voltages of the second stage of the middle page; the fifth-level read voltage L5, the tenth-level read voltage L10, and the twelfth-level read voltage L12 correspond to the read voltages of the second stage of the upper page; the first-level read voltage L1, the fourth-level read voltage L4, and the sixth-level read voltage L6 correspond to the read voltages of the second stage of the extra page.

One example of obtaining at least one of the predicted valley voltage of the second stage or the predicted valley voltages of the remaining first stages having lower read voltages in the plurality of stages according to the predicted valley voltage of the first stage of each of the plurality of pages is provided below.

In examples of the present disclosure, the predicted valley voltage of the low stage (second stage) and the predicted valley voltage of the remaining high stage (first stage) may be obtained by utilizing the predicted valley voltage of the high stage (first stage). In an example, a predicted valley voltage of an stage to be predicted may be obtained according to the predicted valley voltage of the high stage (first stage), the stage in which the stage to be predicted is located (the second stage and the remaining first stages having lower read voltages), and a mapping function. Herein, the mapping function is related to the performance (especially the offset performance of the threshold voltage of the memory cell) of the memory device; and the mapping function may be obtained by fitting a large number of experimental results before the memory device leaves the factory, and saved in the memory device.

It is to be noted that the mapping function does not support cyclic iterations.

In some examples, the peripheral circuit is configured to perform the read operation on the at least one code word according to the predicted valley voltage of the first stage and the predicted valley voltage of the second stage of each page.

In some examples, the peripheral circuit is configured to: determine the predicted valley voltage of each stage as the target valley voltage according to successful error correction decoding on a read result of the read operation; directly perform the read operation on at least one code word according to the predicted valley voltage of the first stage and the predicted valley voltage of the second stage of each page without confirming the predicted valley voltage after determining the predicted valley voltage of each stage, and perform error correction decoding on the read result of the read operation by a controller, and if the error correction decoding is successful, it indicates that the obtained predicted valley voltage may be used as the target valley voltage.

In some examples, the peripheral circuit is configured to: re-obtain a first result corresponding to at least one code word at one target read voltage of the first stage according to failed error correction decoding on the read result of the read operation; re-obtain the prediction parameters according to the plurality of the obtained first results and the plurality of the obtained target read voltages in conjunction with the preset function model; and perform the read operation on the at least one code word based on the re-obtained prediction parameters until the error correction decoding on the read result of the read operation is successful.

In an example, as shown in FIG. 11, when the first parameter and the second parameter are constants, i is equal to 1, and M is equal to 1, one set of prediction parameters may be obtained according to one point (x1, y1) and the quadratic function model corresponding to the first stage of each of a plurality of pages, and the prediction parameters are used as the predicted valley voltage corresponding to the first stage of each of the plurality of pages. At least one of the predicted valley voltage of the second stage or the predicted valley voltages of the remaining first stages having lower read voltages in the plurality of stages of each page are obtained according to the mapping function, and the read operation is performed on at least one code word according to the predicted valley voltage of the first stage and the predicted valley voltage of the second stage of each page.

If the error correction decoding on the read result of the read operation is failed, the first result corresponding to the at least one code word at one target read voltages of the first stage is re-obtained, and the coordinates of this point may be denoted as (x2, y2) (as shown in FIG. 12); b is re-obtained according to the obtained two points (x1, y1) and (x2, y2) in conjunction with the quadratic function model and the calculation formula (2) for b, and the prediction parameter is re-obtained based on the re-obtained b. The predicted valley voltage of the first stage of each of a plurality of pages are obtained based on the re-obtained prediction parameter, and at least one of the predicted valley voltage of the second stage or the predicted valley voltages of the remaining first stages having lower read voltages in the plurality of stages of each page are re-obtained according to the mapping function. The read operation is performed on the at least one code word according to the predicted valley voltage of the first stage and the predicted valley voltage of the second stage of each page.

If the error correction decoding on the read result of the read operation is failed, the first result corresponding to at least one code word at one target read voltage of the first stage is re-obtained, and the coordinates of this point may be denoted as (x3, y3) (as shown in FIG. 13); b is re-obtained according to obtained three points (x1, y1), (x2, y2) and (x3, y3) in conjunction with the quadratic function model and the calculation formula (4) for b, and the prediction parameter is re-obtained based on the re-obtained b. The predicted valley voltage of the first stage of each of a plurality of pages are obtained based on the re-obtained prediction parameter, and at least one of the predicted valley voltage of the second stage or the predicted valley voltages of the remaining first stages having lower read voltages in the plurality of stages of each page are re-obtained according to the mapping function. The read operation is performed on at least one code word according to the predicted valley voltage of the first stage and the predicted valley voltage of the second stage of each page until the error correction decoding on the read result of the read operation is successful.

It is to be noted that re-obtaining the first result corresponding to at least one code word at one target read voltage of the first stage according to failed error correction decoding on the read result of the read operation is the first result at the one target read voltage re-obtained on the basis of the M target read voltages and the M first results that have been obtained. The prediction parameters are then re-obtained based on the obtained (M+1) first results and (M+1) target read voltages in conjunction with the preset function model. M may be any integer of greater than or equal to 1.

As such, the read operation is directly performed on the at least one code word by the obtained predicted valley voltage, and whether the predicted valley voltage is determined as the target valley voltage according to whether the error correction decoding on the read result of the read operation is successful or failed. A duration can be shortened to a certain extent, and the target valley voltage can be determined more rapidly.

In some examples, the memory cell array includes memory cells each having a plurality of storage bits; the plurality of storage bits correspond to a plurality of pages respectively; at least one of the pages corresponds to a plurality of stages; the peripheral circuit is configured to: after determining a target valley voltage of at least one code word at a target stage, respectively determine the target valley voltages of other stages in the plurality of stages than the target stage.

In an example, taking TLC as an example, a target valley voltage of the third-level read voltage L3 is obtained using a manner similar to a manner of obtaining the target valley voltage of the seventh-level read voltage L7 in conjunction with the preset function model, where the target valley voltages of the seventh-level read voltage L7 and the third-level read voltage L3 may be configured to read data of the upper page of at least one code word. The target valley voltages of the first-level read voltage L1 and the fifth-level read voltage L5 are obtained using a manner similar to the manner of obtaining the target valley voltage of the seventh-level read voltage L7 so as to read data of the lower page of the at least one code word. The target valley voltage of the second-level read voltage L2, the target valley voltage of the fourth-level read voltage L4, and the target valley voltage of the sixth-level read voltage L6 are obtained using a manner similar to the manner of obtaining the target valley voltage of the seventh-level read voltage L7, so as to read data of the middle page of the at least one code word.

Figure 15:
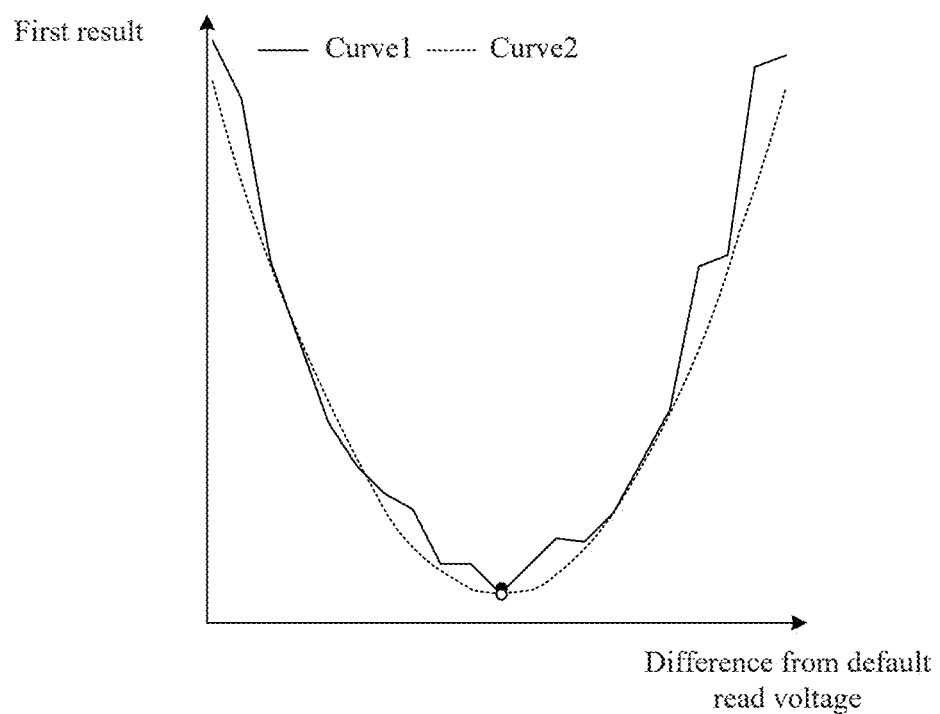
FIG. 15 is a schematic diagram of a determination result of a target valley voltage of the fifth-level read voltage L5 as shown in FIG. 8B provided by an example of the present disclosure.

As shown in FIG. 15, the offset value corresponding to the default read voltage is 0. Taking a difference between the target read voltage and the default read voltage as a horizontal coordinate and the corresponding first result at the target read voltage as a vertical coordinate, the horizontal and vertical coordinates form a point. The point of the target valley voltage is a point corresponding to the target valley voltage as the horizontal coordinate. A first curve (the solid line shown in FIG. 15) is an actual threshold voltage distribution curve corresponding to the fifth-level read voltage L5 as shown in FIG. 8B, and a second curve (the dotted line shown in FIG. 15) is a curve which the preset function model is in corresponding to the fifth-level read voltage L5 as shown in FIG. 8B. As can be known with reference to FIG. 15, an actual target valley voltage (a horizontal coordinate position corresponding to the hollow point in FIG. 15) on the first curve almost coincides with a target valley voltage (a horizontal coordinate position corresponding to the black solid point in FIG. 15) on the second curve. This indicates that the manner of determining the target valley voltage by the preset function model in the examples of the present disclosure is not only more rapid but also high in accuracy.

Figure 16:
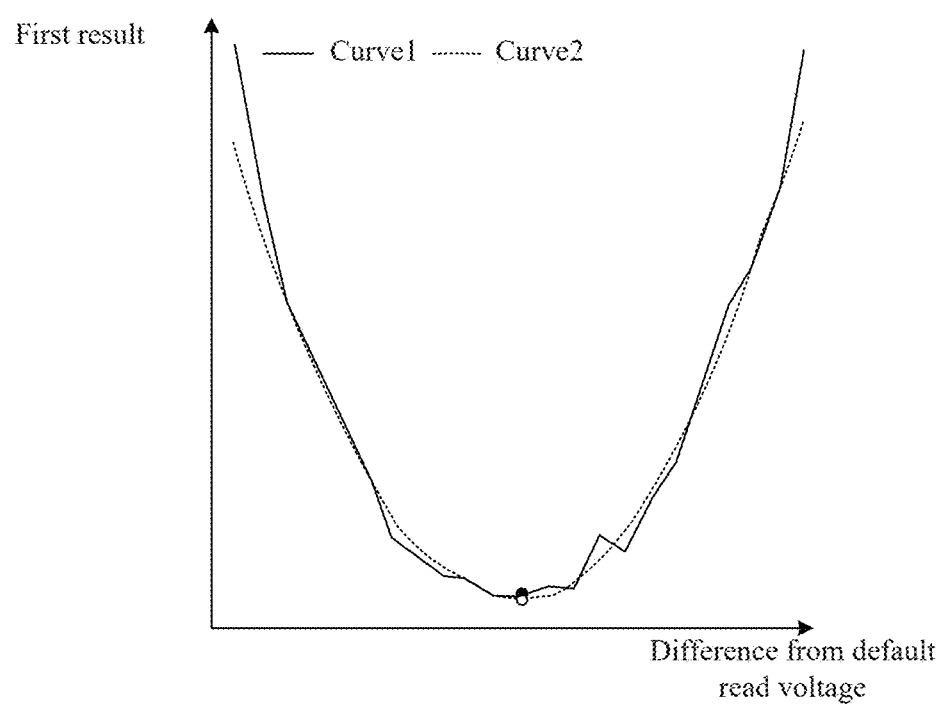
FIG. 16 is a schematic diagram of a determination result of a target valley voltage of a sixth-level read voltage L6 as shown in FIG. 8B provided by an example of the present disclosure.

In an example, as shown in FIG. 16, a first curve (the solid line shown in FIG. 16) is an actual threshold voltage distribution curve corresponding to the sixth-level read voltage L6 as shown in FIG. 8B, and a second curve (the dotted line shown in FIG. 16) is a curve which the preset function model is in corresponding to the sixth-level read voltage L6 as shown in FIG. 8B. As can be known with reference to FIG. 16, an actual target valley voltage (a horizontal coordinate position corresponding to the hollow point in FIG. 16) on the first curve almost coincides with a target valley voltage (a horizontal coordinate position corresponding to the black solid point in FIG. 16) on the second curve.

Figure 17:
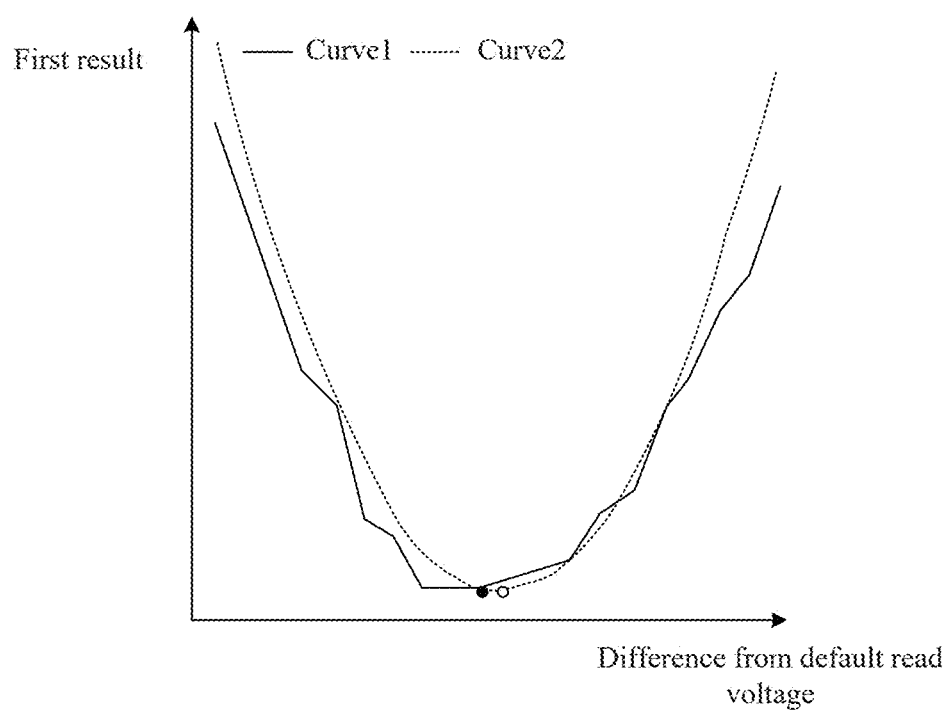
FIG. 17 is a schematic diagram of a determination result of a target valley voltage of a seventh-level read voltage L7 as shown in FIG. 8B provided by an example of the present disclosure.

In an example, as shown in FIG. 17, a first curve (the solid line shown in FIG. 17) is an actual threshold voltage distribution curve corresponding to the seventh-level read voltage L7 as shown in FIG. 8B, and a second curve (the dotted line shown in FIG. 17) is a curve which the preset function model is in corresponding to the seventh-level read voltage L7 as shown in FIG. 8B. As can be known with reference to FIG. 17, an actual target valley voltage (a horizontal coordinate position corresponding to the hollow point in FIG. 17) on the first curve almost coincides with a target valley voltage (a horizontal coordinate position corresponding to the black solid point in FIG. 17) on the second curve.

In the first aspect, in the memory devices provided in the examples of the present disclosure, a first result (a size of the first result may be several bytes) rather than at least one code word (for example, a size of the code word may be 4 KB) is transmitted, so that an amount of transmitted data is reduced. The process of obtaining the first result converges inside the memory device, without occupying, for example, a space of the memory controller, and is less dependent on, for example, the memory controller. The process of obtaining the target valley voltage according to a finite number of target read voltages and first results in conjunction with the preset function model in the memory device accelerates the speed of determining the target valley voltage, reduces the influence of data noise to a certain extent, and improves the reliability; meanwhile, a transmission time of an output port is reduced. This is applicable to a memory device of an MLC, TLC or QLC type.

Figure 18:
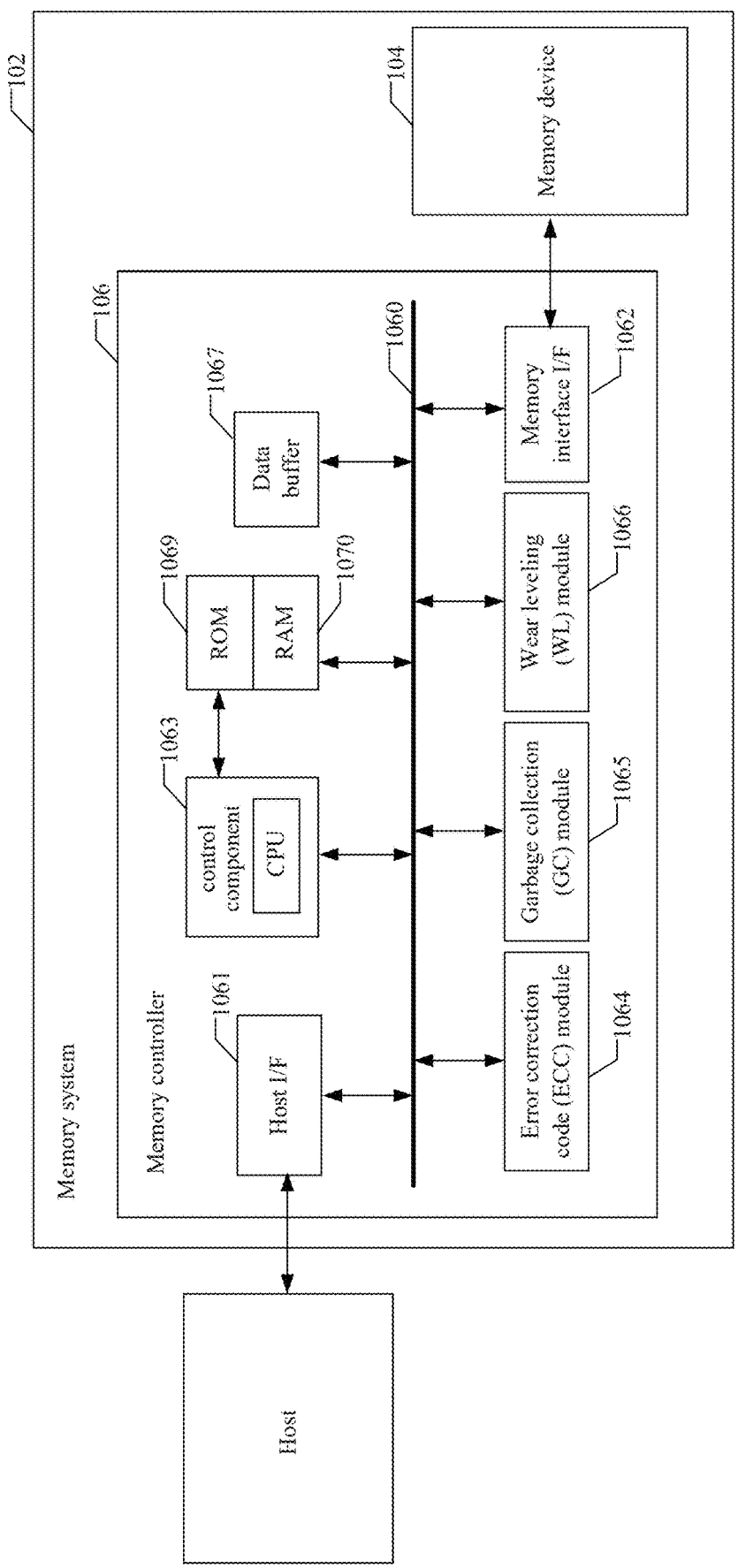
FIG. 18 is a schematic diagram of an example constituent structure having a memory system provided by an example of the present disclosure.
Figure 19:
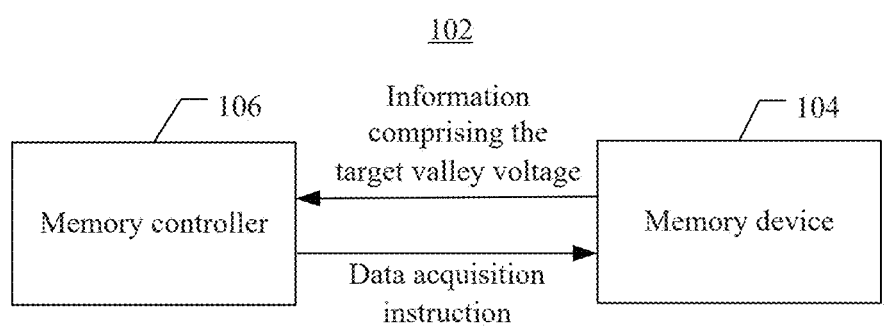
FIG. 19 is a block diagram of a memory system provided by an example of the present disclosure.

In the second aspect, examples of the present disclosure provide a memory system. As shown in FIGS. 18 and 19, the memory system 102 includes: one or more memory devices 104 provided according to the first aspect; and a memory controller 106 coupled with the memory device 104 and configured to control the memory device 104.

As shown in FIG. 18, in some examples, the memory system 102 is coupled with a host, and performs various types of feedback in response to instructions of the host. The memory system 102 may include the memory controller 106 and the memory devices 104. The memory controller 106 is configured to control the memory devices 104 to perform operations such as read, write, erase, etc. The memory controller 106 may also be coupled with the memory devices 104 in any appropriate manners.

The memory controller 106 may include a host interface (I/F) 1061, a memory interface (I/F) 1062, a control component 1063, a read-only memory (ROM) 1069, a random access memory (RAM) 1070, an error correction module 1064, a garbage collection module 1065, a wear leveling module 1066, a buffer 1067, and a bus 1060. The host interface 1061 is a connection interface connecting the host 108 and the memory controller 106; and the host interface 1061 allows the host and the memory controller to communicate according to a particular protocol, send read and write requests, and perform other operations. The memory interface 1062 is a connection interface between the memory controller 106 and the memory device 104; and the memory interface 1062 is configured to achieve data transmission between the memory controller 106 and the memory device 104. The control component 1063 is configured to entirely control the memory system 102, and the aforementioned operations executed by the memory controller are mainly executed and completed by the control component 1063 here. In some examples, the control component 1063 is, for example, a central processing unit (CPU), a micro-processing unit (MCU), etc. The ROM 1069 includes firmware or firmware program codes of the memory controller 106. These codes are used for initializing and operating various members of the memory controller, and the RAM 1070 is configured to buffer data. The error correction module 1064 may further include an encoding portion and a decoding portion. The encoding portion is configured to encode data to be stored, so as to obtain check data, and the decoding portion is configured to decode the check data to detect and correct possible error data in a process of data transmission.

The garbage collection module 1065 is configured to: after a memory space of the memory device reaches a certain threshold, read out valid data in some memory blocks, perform rewrite, and then label these memory blocks, to obtain new spare memory blocks. An implementation of garbage collection may include three operations: selecting a source memory block with a small amount of valid data; finding the valid data from the source memory block; and writing the valid data to a target memory block. In this case, all data in the source memory block becomes invalid data; and the source memory block is labeled, and may be used as a new spare memory block. The wear leveling module 1066 is configured to level wear (a number of erase times) of each memory block in the memory system through data statistics and algorithms. An implementation of wear leveling may include two operations: selecting a source memory block in which cold data is located; and reading valid data in the source memory block and writing same in a memory block with a relatively large number of erase times. In this case, the valid data in the source memory block becomes invalid data, and the source memory block is labeled. The buffer 1067 is configured to buffer data.

In some examples, the memory controller 106 is configured to control the memory device 104 to perform a read operation on at least one code word.

In some examples, the memory device 104 includes: a memory cell array including a plurality of memory cells, a preset number of the memory cells forming a code word; and a peripheral circuit of the memory device 104 that is coupled with the memory cell array and configured to: obtain M first results corresponding to at least one code word at M target read voltages, where the first result includes a number of bits which represents the number of flipped bits in the at least one code word in two read results at a first read voltage and a second read voltage, and a difference between the first read voltage and the second read voltage is less than a preset voltage; obtain a predicted valley voltage according to the M first results and the M target read voltages in conjunction with a preset function model, where the preset function model represents a relationship between the first result and the target read voltage; and determine a target valley voltage based on the predicted valley voltage, where the target valley voltage is used as a read voltage for a read operation on the at least one code word, where M is an integer greater than or equal to 1.

In some examples, the preset function model includes a quadratic function model including the following function relation:

$$y = a(x+b)^2 + c,$$

where y is the first result, x is the target read voltage, b is to represent a prediction parameter, a is a first parameter, and c is a second parameter.

In some examples, the peripheral circuit of the memory device 104 is configured to: obtain the N sets of prediction parameters according to the M first results, the M target read voltages and the quadratic function model, where $$N = C_M^i,$$

i being an integer, and $1 \leq i \leq M$; and obtain the predicted valley voltage according to the N sets of prediction parameters.

In some examples, i is equal to 1, and both of the first parameter and the second parameter are constants; and the peripheral circuit of the memory device 104 is configured to obtain the N sets of prediction parameters according to the M first results, the M target read voltages, the quadratic function model, the first parameter and the second parameter.

In some examples, i is equal to 2, the first parameter is a variable, and the second parameter is a constant; and the peripheral circuit of the memory device 104 is configured to obtain the N sets of prediction parameters and the first parameter according to the M first results, the M target read voltages, the quadratic function model and the second parameter.

In some examples, i is equal to 3, and both of the first parameter and the second parameter are variables; and the peripheral circuit of the memory device 104 is configured to obtain the N sets of prediction parameters, the first parameter and the second parameter according to the M first results, the M target read voltages and the quadratic function model.

In some examples, i is equal to M; and the peripheral circuit of the memory device 104 is configured to: obtain one set of prediction parameters according to the M first results, the M target read voltages and the quadratic function model; and take the prediction parameter as the predicted valley voltage.

In some examples, i is less than M; and the peripheral circuit of the memory device 104 is configured to: determine outliers of the N sets of prediction parameters; and take a median or an average value of the remaining prediction parameters after removal of the outliers from the N sets of prediction parameters as the predicted valley voltage.

In some examples, the memory cell array includes memory cells each having a plurality of storage bits; the plurality of storage bits correspond to a plurality of pages respectively; at least one of the pages corresponds to a plurality of stages; the plurality of stages include a first stage and a second stage; a read voltage of the second stage is less than a read voltage of the first stage; and the peripheral circuit of the memory device 104 is configured to: obtain at least one of a predicted valley voltage of the second stage or predicted valley voltages of the remaining first stages having lower read voltages in the plurality of stages according to the predicted valley voltage of the first stage of each of the plurality of pages; and perform a read operation on the at least one code word according to the predicted valley voltage of the first stage and the predicted valley voltage of the second stage of each page.

In some examples, the peripheral circuit of the memory device 104 is configured to: determine the predicted valley voltage of each stage as the target valley voltage according to successful error correction decoding on a read result of the read operation; re-obtain a first result corresponding to at least one code word at one target read voltages of the first stage according to failed error correction decoding on the read result of the read operation; re-obtain the prediction parameters according to the plurality of the obtained first results and the plurality of the obtained target read voltages in conjunction with the preset function model; and perform the read operation on the at least one code word based on the re-obtained prediction parameters until the error correction decoding on the read result of the read operation is successful.

In some examples, the peripheral circuit of the memory device 104 is configured to: obtain a preset threshold according to a corresponding first result at a first target read voltage of the M target read voltages, where the preset threshold is configured to represent a first result corresponding to a maximum value in an effective range of predicted valley voltage; and take the predicted valley voltage as the target valley voltage according to the first result corresponding to the predicted valley voltage being less than the preset threshold.

In some examples, the memory cell array includes memory cells each having a plurality of storage bits; the plurality of storage bits correspond to a plurality of pages respectively; at least one of the pages corresponds to a plurality of stages; the peripheral circuit of the memory device 104 is configured to: after determining a target valley voltage of at least one code word at a target stage, respectively determine the target valley voltages of other stages in the plurality of stages than the target stage.

In some examples, the peripheral circuit of the memory device 104 is configured to: read storage data of at least one code word at the first read voltage to obtain a second result; read the storage data of the at least one code word at the second read voltage to obtain a third result; perform a logic operation on the second result and the third result to obtain a fourth result; and count a number of bits in the fourth result that represent flip of bits in the third result compared to the second result to obtain the first result.

In some examples, the peripheral circuit of the memory device 104 includes: a first latch, a second latch, and a third latch. The first latch is configured to store the second result; the second latch is configured to store the third result; and the third latch is configured to store the fourth result.

As shown in FIG. 19, in some examples, the memory controller 106 is configured to: send a data acquisition instruction, where the data acquisition instruction indicates acquisition of a target valley voltage. The memory device 104 is configured to: receive the data acquisition instruction, obtain the target valley voltage, and send information including the target valley voltage to the memory controller. The memory controller 106 is further configured to perform a read operation on data stored in the memory device according to the target valley voltage in the information.

In some examples, the memory controller 106 is further configured to perform an error correction code decoding operation on a read result of the read operation. In some implementations, the error correction code decoding operation includes a hard decoding operation using a Low-Density Parity-Check Code (LDPC).

In some examples, the memory controller 106 is configured to: send a mode setting command, where the mode setting command instructs setting a read mode of the memory device to the single level read mode; the single level read mode includes reading at least one bit of storage data stored in the memory cell by one level of read voltage. The memory device 104 is configured to: enter the single level read mode in response to the mode setting command, and obtain the first result corresponding to the at least one code word at the target read voltage in the single level read mode.

In the second aspect, in the memory system provided by the examples of the present disclosure, transmitting the first result (the size of the first result may be a few bytes), rather than transmitting at least one code word (for example, the size of the code word may be 4 KB), reduces the amount of data transmitted between the memory device and the memory controller. The process of obtaining the first result converges inside the memory device, without occupying a space of the memory controller, and is less dependent on the memory controller. Completing the process of obtaining the target valley voltage according to a finite number of target read voltages and first results in conjunction with the preset function model in the memory device reduces at least one of a transmission time of an input/output port of the memory device or the error correction decoding operation time of the memory controller, saves iteration time of an error correction decoding algorithm of the memory controller, and allows for faster error correction decoding. This is applicable to a memory system of an MLC, TLC or QLC type.

In the third aspect, examples of the present disclosure provide a memory controller coupled with at least one memory device. The memory device includes a plurality of memory cells, and a preset number of the memory cells form a code word. The memory controller includes a control component configured to: obtain M first results corresponding to at least one code word at M target read voltages, where the first result includes a number of bits which represents the number of flipped bits in the at least one code word in two read results at a first read voltage and a second read voltage, and a difference between the first read voltage and the second read voltage is less than a preset voltage; obtain a predicted valley voltage according to the M first results and the M target read voltages in conjunction with a preset function model, where the preset function model represents a relationship between the first results and the target read voltages; and determine a target valley voltage based on the predicted valley voltage, where the target valley voltage is configured as a read voltage for a read operation on the at least one code word, where M is an integer greater than or equal to 1.

In some examples, the preset function model includes a quadratic function model including the following function relation:

$$y = a(x+b)^2 + c,$$

where y is the first result, x is the target read voltage, b is to represent a prediction parameter, a is a first parameter, and c is a second parameter.

In some examples, the control component is configured to: obtain the N sets of prediction parameters according to the M first results, the M target read voltages and the preset function model, where $$N = C_M^i,$$

i being an integer, and $1 \leq i \leq M$; and obtain the predicted valley voltage according to the N sets of prediction parameters.

In some examples, i is equal to 1, and both of the first parameter and the second parameter are constants; and the control component is configured to obtain the N sets of prediction parameters according to the M first results, the M target read voltages, the preset function model, the first parameter and the second parameter.

In some examples, i is equal to 2, the first parameter is a variable, and the second parameter is a constant; and the control component is configured to obtain the N sets of prediction parameters and the first parameter according to the M first results, the M target read voltages, the preset function model and the second parameter.

In some examples, i is equal to 3, and both of the first parameter and the second parameter are variables; and the control component is configured to obtain the N sets of prediction parameters, the first parameter and the second parameter according to the M first results, the M target read voltages and the preset function model.

In some examples, i is equal to M; and the control component is configured to: obtain one set of prediction parameters according to the M first results, the M target read voltages and the preset function model; and take the prediction parameters as the predicted valley voltage.

In some examples, i is less than M; the control component is configured to: determine outliers of the N sets of prediction parameters; and take a median or an average value of the remaining prediction parameters after removal of the outliers from the N sets of prediction parameters as the predicted valley voltage.

In some examples, the memory cell array includes memory cells each having a plurality of storage bits; the plurality of storage bits correspond to a plurality of pages respectively; at least one of the pages corresponds to a plurality of stages; the plurality of stages include a first stage and a second stage; a read voltage of the second stage is less than a read voltage of the first stage; and the control component is configured to: obtain a predicted valley voltage of the second stage according to the predicted valley voltage of the first stage of each of the plurality of pages; and perform a read operation on the at least one code word according to the predicted valley voltage of the first stage and the predicted valley voltage of the second stage of each page.

In some examples, the control component is configured to: determine the predicted valley voltage of each stage as the target valley voltage according to successful error correction decoding on a read result of the read operation; re-obtain a first result corresponding to at least one code word at one target read voltages of the first stage according to failed error correction decoding on the read result of the read operation; re-obtain the prediction parameters according to the plurality of the obtained first results and the plurality of the obtained target read voltages in conjunction with the preset function model; and perform the read operation on at least one code word based on the re-obtained prediction parameters until error correction decoding on the read result of the read operation is successful.

In some examples, the control component is configured to: obtain a preset threshold according to a corresponding first result at a first target read voltage of the M target read voltages, where the preset threshold is configured to represent a first result corresponding to a maximum value in an effective range of predicted valley voltage; and take the predicted valley voltage as the target valley voltage according to the first result corresponding to the predicted valley voltage being less than the preset threshold.

In some examples, the memory device includes memory cells each having a plurality of storage bits; the plurality of storage bits correspond to a plurality of pages respectively; at least one of the pages corresponds to a plurality of stages; and the control component is configured to: after determining a valley voltage of at least one code word at a target stage, respectively determine target valley voltages of other stages in the plurality of stages than the target stage.

In some examples, a data amount of the first result is less than a preset data amount threshold. In an example, the data amount of the first result ranges from 1 byte to 4 bytes, so that during determining of the target valley voltage, data is transmitted between the memory device and the memory controller with a small amount and a fast speed, which is favorable to improvement of an overall speed of the read operation.

Here, the control component may be understood in connection with the control component illustrated in FIG. 18. It is to be noted that in this example of the present disclosure, the executive subject is changed from the above peripheral circuit into the control component in the memory controller. That is, in this example of the present disclosure, M target read voltages and M first results are obtained by the memory device; at the same time, the control component performs analysis and processing using the M target read voltages and the M first results, and determines the target valley voltage according to analysis and processing situations.

In the third aspect, in the memory controller provided by the examples of the present disclosure, transmitting the first result (the size of the first result may be a few bytes), rather than transmitting at least one code word (for example, the size of the code word may be 4 KB), between the memory device and the memory controller, reduces the amount of data transmitted between the memory device and the memory controller. The process of obtaining the first result converges inside the memory device, without occupying a space of the memory controller, and is less dependent on the memory controller. Compared with in the memory device, completing the process of obtaining the target valley voltage according to a finite number of target read voltages and first results in conjunction with the preset function model in the memory controller is higher in efficiency, reduces at least one of a transmission time of an input/output port of the memory device or an error correction decoding operation time of the memory controller, saves iteration time of an error correction decoding algorithm of the memory controller, and allows for faster error correction decoding. This is applicable to a memory system of an MLC, TLC or QLC type.

In a fourth aspect, examples of the present disclosure provide an operation method of a memory device. The memory device includes a plurality of memory cells, and a preset number of the memory cells form a code word. The operation method of the memory device includes: obtaining M first results corresponding to at least one code word at M target read voltages, where the first result includes a number of bits which represents the number of flipped bits in the at least one code word in two read results at a first read voltage and a second read voltage, and a difference between the first read voltage and the second read voltage is less than a preset voltage; obtaining a predicted valley voltage according to the M first results and the M target read voltages in conjunction with a preset function model, where the preset function model represents a relationship between the first result and the target read voltage; and determining a target valley voltage based on the predicted valley voltage, where the target valley voltage is used as a read voltage for a read operation on the at least one code word, where M is an integer greater than or equal to 1.

In some examples, the preset function model includes a quadratic function model including the following function relation:

$$y = a(x+b)^2 + c,$$

where y is the first result, x is the target read voltage, b is to represent a prediction parameter, a is a first parameter, and c is a second parameter.

In some examples, the operation method of the memory device includes: obtaining N sets of prediction parameters according to the M first results, the M target read voltages and the preset function model, where $$N = C_M^i,$$

i being an integer, and $1 \leq i \leq M$; and obtaining the predicted valley voltage according to the N sets of prediction parameters.

In some examples, i is equal to 1, and both of the first parameter and the second parameter are constants; and the operation method of the memory device includes: obtaining the N sets of prediction parameters according to the M first results, the M target read voltages, the preset function model, the first parameter and the second parameter.

In some examples, i is equal to 2, the first parameter is a variable, and the second parameter is a constant; and the operation method of the memory device includes: obtaining the N sets of prediction parameters and the first parameter according to the M first results, the M target read voltages, the preset function model and the second parameter.

In some examples, i is equal to 3, and both of the first parameter and the second parameter are variables; and the operation method of the memory device includes: obtaining the N sets of prediction parameters, the first parameter and the second parameter according to the M first results, the M target read voltages and the preset function model.

In some examples, i is equal to M; and the operation method of the memory device includes: obtaining one set of prediction parameters according to the M first results, the M target read voltages and the preset function model; and taking the prediction parameters as the predicted valley voltage.

In some examples, i is less than M; and the operation method of the memory device includes: determining outliers of the N sets of prediction parameters; and taking a median or an average value of the remaining prediction parameters after removal of the outliers from the N sets of prediction parameters as the predicted valley voltage.

In some examples, the memory cell array includes memory cells each having a plurality of storage bits; the plurality of storage bits correspond to a plurality of pages respectively; at least one of the pages corresponds to a plurality of stages; the plurality of stages include a first stage and a second stage; a read voltage of the second stage is less than a read voltage of the first stage; and the operation method of the memory device includes: obtaining a predicted valley voltage of the second stage according to the predicted valley voltage of the first stage of each of the plurality of pages; and performing a read operation on the at least one code word according to the predicted valley voltage of the first stage and the predicted valley voltage of the second stage of each page.

In some examples, the operation method of the memory device includes: determining the predicted valley voltage of each stage as the target valley voltage according to successful error correction decoding on a read result of the read operation; re-obtaining a first result corresponding to at least one code word at one target read voltage of the first stage according to failed error correction decoding on the read result of the read operation; re-obtaining the prediction parameters according to the plurality of the obtained first results and the plurality of the obtained target read voltages in conjunction with the preset function model; and performing the read operation on the at least one code word based on the re-obtained prediction parameters until error correction decoding on the read result of the read operation is successful.

In some examples, the operation method of the memory device includes: obtaining a preset threshold according to a corresponding first result at a first target read voltage of the M target read voltages, where the preset threshold is configured for representing a first result corresponding to a maximum value in an effective range of predicted valley voltage; and taking the predicted valley voltage as the target valley voltage according to the first result corresponding to the predicted valley voltage being less than the preset threshold.

In some examples, the memory device includes memory cells each having a plurality of storage bits; the plurality of storage bits correspond to a plurality of pages respectively; at least one of the pages corresponds to a plurality of stages; and the operation method of the memory device includes: after determining a valley voltage of at least one code word at a target stage, respectively determining the target valley voltages of other stages in the plurality of stages than the target stage.

It is to be noted that an executive body in the operation method of the memory device may be a peripheral circuit or a memory controller.

In a fifth aspect, examples of the present disclosure provide an operation method of a memory system, including: sending a data acquisition instruction by a memory controller in the memory system, the data acquisition instruction instructing acquisition of a target valley voltage; receiving the data acquisition instruction by a memory device in the memory system, obtaining the target valley voltage according to the operation method of a memory device in the fourth aspect, and sending information including the target valley voltage to the memory controller; and performing a read operation by the memory controller on data stored in the memory device according to the target valley voltage in the information.

In some examples, the memory device in the memory system includes a plurality of memory cells, and a preset number of the memory cells form a code word. The operation method of the memory system includes: obtaining M first results corresponding to the at least one code word at M target read voltages, where the first result includes a number of bits which represents the number of flipped bits in the at least one code word in two read results at a first read voltage and a second read voltage, and a difference between the first read voltage and the second read voltage is less than a preset voltage; obtaining a predicted valley voltage according to the M first results and the M target read voltages in conjunction with a preset function model, where the preset function model represents a relationship between the first results and the target read voltages; and determining a target valley voltage based on the predicted valley voltage, where the target valley voltage is used as a read voltage for a read operation on the at least one code word, where M is an integer greater than or equal to 1.

In a sixth aspect, examples of the present disclosure provide an operation method of a memory controller. The memory controller is coupled with at least one memory device. The memory device includes a plurality of memory cells, and a preset number of the memory cells form a code word. The operation method of the memory controller includes: obtaining M first results corresponding to at least one code word at M target read voltages, where the first result includes a number of bits which represents the number of flipped bits in the at least one code word in two read results at a first read voltage and a second read voltage, and a difference between the first read voltage and the second read voltage is less than a preset voltage; obtaining a predicted valley voltage according to the M first results and the M target read voltages in conjunction with a preset function model, where the preset function model represents a relationship between the first result and the target read voltage; and determining a target valley voltage based on the predicted valley voltage, where the target valley voltage is used as a read voltage for a read operation on the at least one code word, where M is an integer greater than or equal to 1.

In some examples, the preset function model includes a quadratic function model including the following function relation:

$$y = a(x+b)^2 + c,$$

where y is the first result, x is the target read voltage, b is to represent a prediction parameter, a is a first parameter, and c is a second parameter.

In some examples, the operation method of the memory controller includes: obtaining N sets of prediction parameters according to the M first results, the M target read voltages and the preset function model, where $$N = C_M^i,$$

i being an integer, and $1 \leq i \leq M$; and obtaining the predicted valley voltage according to the N sets of prediction parameters.

In some examples, i is equal to 1, and both of the first parameter and the second parameter are constants; and the operation method of the memory controller includes: obtaining the N sets of prediction parameters according to the M first results, the M target read voltages, the preset function model, the first parameter and the second parameter.

In some examples, i is equal to 2, the first parameter is a variable, and the second parameter is a constant; and the operation method of the memory controller includes: obtaining the N sets of prediction parameters and the first parameter according to the M first results, the M target read voltages, the preset function model and the second parameter.

In some examples, i is equal to 3, and both of the first parameter and the second parameter are variables; and the operation method of the memory controller includes: obtaining the N sets of prediction parameters, the first parameter and the second parameter according to the M first results, the M target read voltages and the preset function model.

In some examples, i is equal to M; and the operation method of the memory controller includes: obtaining one set of prediction parameters according to the M first results, the M target read voltages and the preset function model; and taking the prediction parameter as the predicted valley voltage.

In some examples, i is less than M; and the operation method of the memory controller includes: determining outliers of the N sets of prediction parameters; and taking a median or an average value of the remaining prediction parameters after removal of the outliers from the N sets of prediction parameters as the predicted valley voltage.

In some examples, the memory cell array includes memory cells each having a plurality of storage bits; the plurality of storage bits correspond to a plurality of pages respectively; at least one of the pages corresponds to a plurality of stages; the plurality of stages include a first stage and a second stage; a read voltage of the second stage is less than a read voltage of the first stage; and the operation method of the memory controller includes: obtaining a predicted valley voltage of the second stage according to the predicted valley voltage of the first stage of each of the plurality of pages; and performing a read operation on the at least one code word according to the predicted valley voltage of the first stage and the predicted valley voltage of the second stage of each page.

In some examples, the operation method of the memory controller includes: determining the predicted valley voltage of each stage as the target valley voltage according to successful error correction decoding on a read result of the read operation; re-obtaining a first result corresponding to the at least one code word at one target read voltage of the first stage according to failed error correction decoding on the read result of the read operation; re-obtaining the prediction parameters according to the plurality of the obtained first results and the plurality of the obtained target read voltages in conjunction with the preset function model; and performing the read operation on the at least one code word based on the re-obtained prediction parameters until error correction decoding on the read result of the read operation is successful.

In some examples, the operation method of the memory controller includes: obtaining a preset threshold according to a corresponding first result at a first target read voltage of the M target read voltages, where the preset threshold is configured for representing a first result corresponding to a maximum value in an effective range of predicted valley voltage; and taking the predicted valley voltage as the target valley voltage according to the first result corresponding to the predicted valley voltage being less than the preset threshold.

In some examples, the memory device includes memory cells each having a plurality of storage bits; the plurality of storage bits correspond to a plurality of pages respectively; at least one of the pages corresponds to a plurality of stages; and the operation method of the memory controller includes: after determining a valley voltage of the at least one code word at a target stage, respectively determining target valley voltages of other stages in the plurality of stages than the target stage.

Figure 20:
FIG. 20 is a timing diagram of example enablement of a single level read mode operation provided by the present disclosure.

FIG. 20 is a timing diagram of example enablement of a single level read mode operation provided according to the present disclosure. DQx may represent a data bus signal, and Cycle Type may further represent a type of the data bus signal.

As shown in FIG. 20, a function setup command may include, for example, a subcommand (e.g., EFh). In an example, the memory device initiates the single level read mode upon receiving the subcommand EFh. In the single level read mode, the memory device transmits addresses ADDR (e.g., two column addresses C1-C2 and three row addresses R1-R3) of data to be read between received subcommands 00h and 30h. The corresponding data DATA (e.g., Dn) in a page of the received addresses can be buffered in the page buffer during read time, and then the data DATA is read as required. It is to be noted that in the above examples, frequent transmission (Din/Dout) of data (e.g., Dn) corresponding to one physical page between the memory device and the memory controller is required during the read retry operation, and thus the transmission of the data takes a long time.

Figure 21:
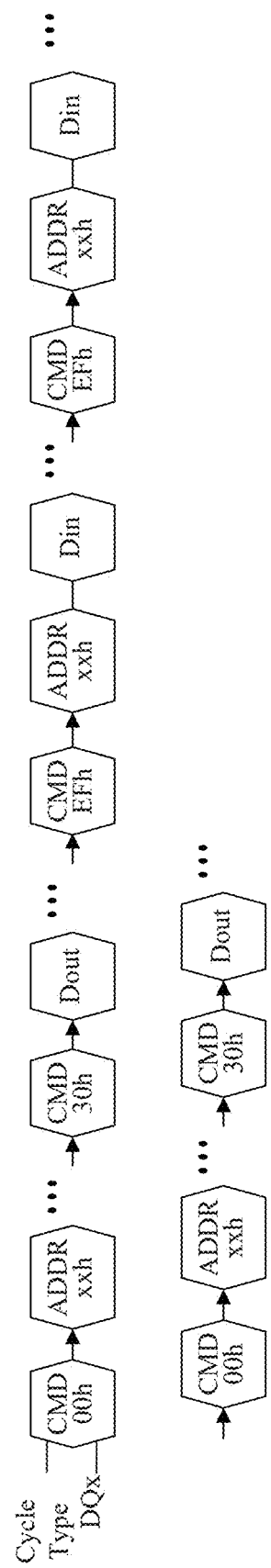
FIG. 21 is a timing diagram of determination of a target valley voltage and execution of a read operation provided by an example of the present disclosure.

FIG. 21 is a timing diagram of determination of a target valley voltage and execution of a read operation provided by an example of the present disclosure. As shown in FIG. 21, the read command may include, for example, two subcommands (e.g., 00h and 30h). In an example, the memory device transmits addresses ADDR (e.g., two column addresses C1-C2 and three row addresses R1-R3) of data to be read between the received subcommands 00h and 30h.

After receiving the subcommand 30h, the memory device may buffer corresponding data DATA (e.g., Dn) in a page of the received addresses in the page buffer during read time, and then read the data DATA as required.

In example implementations, the memory device 104 transmits, between the received sub-commands 00h and 30h, addresses ADDR (for example, two column addresses C1-C2 and three row addresses R1-R3) of data to be read. After receiving the subcommand 30h, the memory device 104 receives subcommands EFh and xxh of the data acquisition instruction, and the memory device 104 is instructed by the data acquisition instruction to obtain M first results corresponding to the code word at M target read voltages and send the M target read voltages and the M first results to the memory controller. The memory controller determines a target valley voltage according to the M target read voltages and the M first results received from the memory device in conjunction with the preset function model, and performs a read operation on data stored in the memory device according to the target valley voltage.

It is to be noted that the data acquisition instruction provided in the examples of the present disclosure is only an example, and should not unduly limit the protection scope of the present disclosure.

In some implementations, a data amount of the first result is less than a preset data amount threshold. For example, the data amount of the first result ranges from 1 byte to 4 bytes, so that during determining the target valley voltage, data is transmitted between the memory device and the memory controller with a small amount and a fast speed, which is favorable to improvement of an overall speed of the read operation.

Examples of the present disclosure further provide a storage medium, where the storage medium stores executable instructions which, when executed, may implement operations of the operation method in the above examples of the present disclosure.

In some examples, the storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a Compact Disc Read-Only Memory (CD-ROM), etc., or may be various apparatuses including any one or combination of the above memory devices.

In some examples, an executable instruction may be compiled in any form of programming language (including a compiling or interpreting language, or a declarative or procedural language) by adopting a form of a program, a software, a software module, a script or a code; and it may be deployed in any form, including deployed as an independent program or as a module, a component, a subroutine, or other units suitable for use in a computing environment.

As an example, the executable instruction may, but do not necessarily, correspond to files in a file system, may be stored in part of a file storing other programs or data, for example, stored in one or more scripts in a hypertext markup language (HTML) document, stored in single file dedicated for the discussed program, or stored in a plurality of cooperative files (e.g., the file for storing one or more modules, subprograms or code portions).

As an example, the executable instruction may be deployed on an electronic apparatus for execution, or on a plurality of electronic apparatuses at one site for execution, or distributed on a plurality of electronic apparatuses interconnected through a communication network at a plurality of sites for execution.

Figure 22:
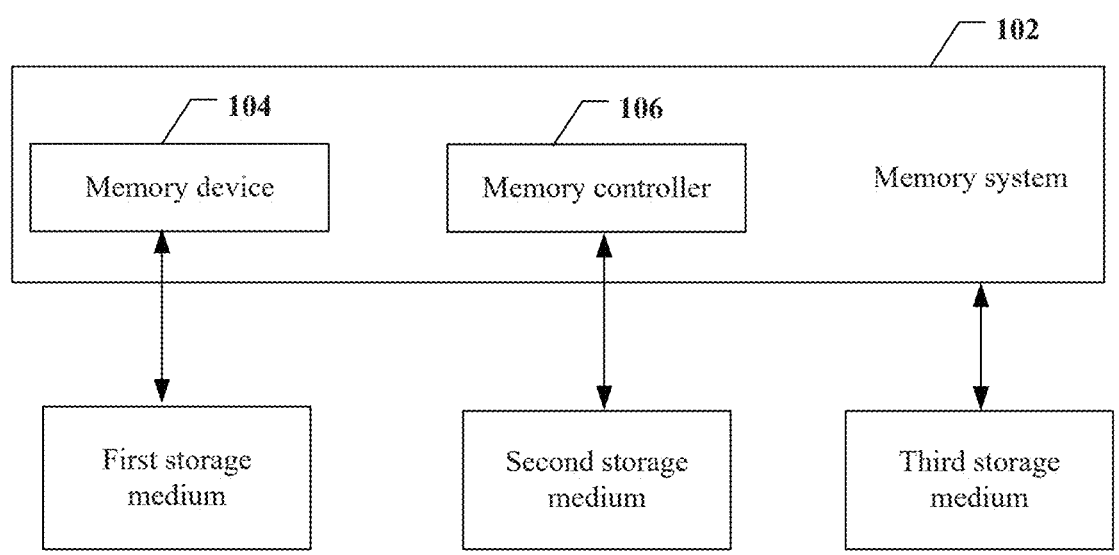
FIG. 22 is a schematic diagram of a constituent structure of a storage medium provided by an example of the present disclosure.

In some examples, referring to FIG. 22, FIG. 22 is a schematic diagram of a constituent structure of a storage medium provided according to examples of the present disclosure. The storage medium includes a first storage medium corresponding to the memory device 104, a second storage medium corresponding to the memory controller 106, and a third storage medium corresponding to the memory system 102. When the executable instructions are executed by the memory device, the first storage medium may be configured to implement operations of the operation method of the memory device in the above examples of the present disclosure. When the executable instructions are executed by the memory controller, the second storage medium may be configured to implement operations of the operation method of the memory controller in the above examples of the present disclosure. When the executable instructions are executed by the memory system, the third storage medium may be configured to implement operations of the operation method of the memory system in the above examples of the present disclosure.

It is to be understood that references to "one example" or "an example" throughout this specification mean that particular features, structures, or characteristics related to the example are included in at least one example of the present disclosure. Therefore, "in one example" or "in an example" appearing at any place of the whole specification does not always refer to the same example. In addition, these particular features, structures, or characteristics may be combined in one or more examples in any proper manner. It is to be understood that, in various examples of the present disclosure, sequence numbers of the above processes do not indicate an execution sequence, and the execution sequence of various processes shall be determined by functionalities and intrinsic logics thereof, and shall constitute no limitation on an implementation process of the examples of the present disclosure. The above sequence numbers of the examples of the present disclosure are only for description, and do not represent goodness and badness of the examples.

The above descriptions are merely implementations of the present disclosure, and not intended to limit the patent scope of the present disclosure. Equivalent structure transformation made using the contents of the specification and the drawings of the present disclosure under the inventive concept of the present disclosure, or direct/indirect application to other related technical fields are both encompassed within the patent protection scope of the present disclosure.

What is claimed is:

1. A memory device, comprising:
a memory cell array comprising a plurality of memory cells, a preset number of the memory cells forming a code word; and
a peripheral circuit coupled with the memory cell array and configured to:
obtain M first results corresponding to at least one code word at M target read voltages, wherein the first result comprises a number of bits which represents the number of flipped bits in the at least one code word in two read results at a first read voltage and a second read voltage, and wherein a difference between the first read voltage and the second read voltage is less than a preset voltage;
obtain a predicted valley voltage according to the M first results and the M target read voltages in conjunction with a preset function model, wherein the preset function model represents a relationship between the first results and the target read voltages, and wherein M is an integer greater than or equal to 1; and
determine a target valley voltage based on the predicted valley voltage, wherein the target valley voltage is configured as a read voltage for a read operation on the at least one code word.

2. The memory device of claim 1, wherein the preset function model comprises a quadratic function model comprising the following function relation:

$$y = a(x+b)^2 + c$$

wherein y is the first result, x is the target read voltage, b is to represent a prediction parameter, a is a first parameter, and c is a second parameter.

3. The memory device of claim 2, wherein the peripheral circuit is configured to:
obtain N sets of prediction parameters according to the M first results, the M target read voltages and the quadratic function model, wherein $$N = C_M^i,$$

i is an integer, and 1≤i≤M; and
obtain the predicted valley voltage according to the N sets of prediction parameters.

4. The memory device of claim 3, wherein i is equal to 1, wherein both of the first parameter and the second parameter are constants, and wherein the peripheral circuit is configured to:
obtain the N sets of prediction parameters according to the M first results, the M target read voltages, the quadratic function model, the first parameter and the second parameter.

5. The memory device of claim 3, wherein i is equal to 2, wherein the first parameter is a variable and the second parameter is a constant, and wherein the peripheral circuit is configured to:
obtain the N sets of prediction parameters and the first parameter according to the M first results, the M target read voltages, the quadratic function model and the second parameter.

6. The memory device of claim 3, wherein i is equal to 3, wherein both of the first parameter and the second parameter are variables, and wherein the peripheral circuit is configured to:
obtain the N sets of prediction parameters, the first parameter and the second parameter according to the M first results, the M target read voltages and the quadratic function model.

7. The memory device of claim 4, wherein i is equal to M, and wherein the peripheral circuit is configured to:
obtain one set of prediction parameters according to the M first results, the M target read voltages and the quadratic function model; and
take the prediction parameters as the predicted valley voltage.

8. The memory device of claim 4, wherein i is less than M, and wherein the peripheral circuit is configured to:
determine outliers of the N sets of prediction parameters; and take a median or an average value of the remaining prediction parameters after removal of the outliers from the N sets of prediction parameters as the predicted valley voltage.

9. The memory device of claim 3, wherein the memory cell array comprises memory cells each having a plurality of storage bits, wherein the plurality of storage bits correspond to a plurality of pages respectively, wherein at least one of the pages corresponds to a plurality of stages, wherein the plurality of stages comprise a first stage and a second stage, wherein a read voltages of the second stage is less than a read voltage of the first stage, and wherein the peripheral circuit is configured to:
obtain at least one of a predicted valley voltage of the second stage or predicted valley voltages of the remaining first stages having lower read voltages in the plurality of stages according to the predicted valley voltage of the first stage of each of the plurality of pages; and
perform a read operation on the at least one code word according to the predicted valley voltage of the first stage and the predicted valley voltage of the second stage of each page.

10. The memory device of claim 9, wherein the peripheral circuit is configured to:
determine the predicted valley voltage of each stage as the target valley voltage according to successful error correction decoding on a read result of the read operation;
re-obtain a first result corresponding to the at least one code word at one target read voltage of the first stage according to failed error correction decoding on the read result of the read operation;
re-obtain the prediction parameters according to a plurality of first results obtained and a plurality of target read voltages in conjunction with the preset function model; and
perform the read operation on the at least one code word based on the re-obtained prediction parameters until the error correction decoding on the read result of the read operation is successful.

11. The memory device of claim 1, wherein the peripheral circuit is configured to:
obtain a preset threshold according to a corresponding first result at a first target read voltage of the M target read voltages, wherein the preset threshold is configured to represent a first result corresponding to a maximum value in an effective range of predicted valley voltage; and
take the predicted valley voltage as the target valley voltage according to the first result corresponding to the predicted valley voltage being less than the preset threshold.

12. The memory device of claim 1, wherein the memory cell array comprises memory cells each having a plurality of storage bits, wherein the plurality of storage bits correspond to a plurality of pages respectively, wherein at least one of the pages corresponds to a plurality of stages, and wherein the peripheral circuit is configured to:
after determining a target valley voltage of the at least one code word at a target stage, respectively determine target valley voltages of other stages in the plurality of stages than the target stage.

13. The memory device of claim 1, wherein the peripheral circuit is configured to:
read a storage data of the at least one code word at the first read voltage to obtain a second result;
read the storage data of the at least one code word at the second read voltage to obtain a third result;
perform a logic operation on the second result and the third result to obtain a fourth result; and
count the number of bits in the fourth result that represent flip of bits in the third result compared to the second result to obtain the first result.

14. The memory device of claim 13, wherein the peripheral circuit comprises:
a first latch configured to store the second result;
a second latch configured to store the third result; and
a third latch configured to store the fourth result.

15. A memory system, comprising:
one or more memory devices, each of the one or more memory device comprising:
a memory cell array comprising a plurality of memory cells, wherein a preset number of the memory cells form a code word; and
a peripheral circuit coupled with the memory cell array and configured to:
obtain M first results corresponding to at least one code word at M target read voltages, wherein the first result comprises a number of bits which represents the number of flipped bits in the at least one code word in two read results at a first read voltage and a second read voltage, and wherein a difference between the first read voltage and the second read voltage is less than a preset voltage;
obtain a predicted valley voltage according to the M first results and the M target read voltages in conjunction with a preset function model, wherein the preset function model represents a relationship between the first results and the target read voltages, and wherein M is an integer greater than or equal to 1; and
determine a target valley voltage based on the predicted valley voltage, wherein the target valley voltage is configured as a read voltage for a read operation on the at least one code word; and
a memory controller coupled with the one or more memory devices and configured to control the one or more memory devices.

16. The memory system of claim 15, wherein:
the memory controller is configured to send a data acquisition instruction,
the data acquisition instruction indicates acquisition of the target valley voltage,
the memory device is configured to receive the data acquisition instruction, obtain the target valley voltage, and send information comprising the target valley voltage to the memory controller, and
the memory controller is further configured to perform the read operation on data stored in the memory device according to the target valley voltage in the information.

17. The memory system of claim 16, wherein the memory controller is further configured to perform an error correction decoding operation on a read result of the read operation.

18. A memory controller, comprising:
a control component configured to:
obtain M first results corresponding to at least one code word at M target read voltages, wherein the first result comprises a number of bits which represents the number of flipped bits in the at least one code word in two read results at a first read voltage and a second read voltage, and wherein a difference between the first read voltage and the second read voltage is less than a preset voltage;

obtain a predicted valley voltage according to the M first results and the M target read voltages in conjunction with a preset function model, wherein the preset function model represents a relationship between the first results and the target read voltages, and wherein M is an integer greater than or equal to 1; and determine a target valley voltage based on the predicted valley voltage, wherein the target valley voltage is configured as a read voltage for a read operation on the at least one code word, wherein the memory controller is coupled with at least one memory device, wherein the memory device comprises a plurality of memory cells, and wherein a preset number of the memory cells forming a code word.

19. The memory controller of claim 18, wherein the preset function model comprises a quadratic function model comprising the following function relation:

$$y = a(x+b)^2 + c$$

wherein y is the first result, x is the target read voltage, b is to represent a prediction parameter, a is a first parameter, and c is a second parameter.

20. The memory controller of claim 19, wherein the control component is configured to:

obtain N sets of prediction parameters according to the M first results, the M target read voltages and the preset function model, wherein $$N = C_M^i,$$

i is an integer, and 1≤i≤M; and obtain the predicted valley voltage according to the N sets of prediction parameters;

wherein both of the first parameter and the second parameter are constants, and wherein the control component is configured to:

obtain the N sets of prediction parameters according to the M first results, the M target read voltages, the preset function model, the first parameter and the second parameter; or wherein i is equal to 2, wherein the first parameter is a variable, and the second parameter is a constant, and wherein the control component is configured to:

obtain the N sets of prediction parameters and the first parameter according to the M first results, the M target read voltages, the preset function model and the second parameter; or wherein i is equal to 3, wherein both of the first parameter and the second parameter are variables, and wherein the control component is configured to:

obtain the N sets of prediction parameters, the first parameter and the second parameter according to the M first results, the M target read voltages, and the preset function model.

* * * * *